(12) United States Patent
Godin et al.

(10) Patent No.: US 11,467,709 B2
(45) Date of Patent: Oct. 11, 2022

(54) MIXED-REALITY GUIDE DATA COLLECTION AND PRESENTATION

(71) Applicant: Microsoft Technology Licensing, LLC, Redmond, WA (US)

(72) Inventors: Alexandre Pierre Michel Godin, Vancouver (CA); Andrew Jackson Klein, Vancouver (CA); Arni Mar Thrastarson, Vancouver (CA); Charla Marie Pereira, North Vancouver (CA); Cydney Brooke Nielsen, Vancouver (CA); Darren Alexander Bennett, Vancouver (CA); Jason Drew Vantomme, Lions Bay (CA); Joel Jamon Rendon, New Westminster (CA); Kjartan Olafsson, Vancouver (CA); Mahesh Keshav Kamat, Vancouver (CA); Maya Alethea Miller-Vedam, Vancouver (CA); Ryan Martin Nadel, Vancouver (CA); Robert István Butterworth, Burnaby (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/785,353

(22) Filed: Feb. 7, 2020

(65) Prior Publication Data
US 2020/0273255 A1    Aug. 27, 2020

Related U.S. Application Data

(60) Provisional application No. 62/808,848, filed on Feb. 22, 2019.

(51) Int. Cl.
| | | |
|---|---|---|
| G06F 3/04815 | (2022.01) | |
| G06F 3/0482 | (2013.01) | |

(Continued)

(52) U.S. Cl.
CPC ....... *G06F 3/04815* (2013.01); *G02B 27/017* (2013.01); *G02B 27/0172* (2013.01);
(Continued)

(58) Field of Classification Search
CPC .... G06F 3/04815; G06F 3/012; G06F 3/0482; G06F 3/011; G06F 3/04845; G06F 3/167;
(Continued)

(56) References Cited

U.S. PATENT DOCUMENTS

| | | |
|---|---|---|
| 2010/0257252 A1 | 10/2010 | Dougherty et al. |
| 2011/0279445 A1 | 11/2011 | Murphy et al. |

(Continued)

FOREIGN PATENT DOCUMENTS

| | | |
|---|---|---|
| EP | 2600331 A1 | 6/2013 |
| WO | 2018106735 A1 | 6/2018 |

OTHER PUBLICATIONS

"Application as Filed in U.S. Appl. No. 16/426,715", filed May 30, 2019, 50 Pages.

(Continued)

*Primary Examiner* — YuJang Tswei
(74) *Attorney, Agent, or Firm* — Chin IP, PLLC

(57) ABSTRACT

The disclosed technology is generally directed to mixed-reality devices. In one example of the technology, a first mixed-reality guide is provided mixed-reality devices, enabling the mixed-reality devices to operate the first mixed-reality guide while providing a mixed-reality view, such that: while the first mixed-reality guide is navigated to a step of the set of steps of the first mixed-reality guide, the mixed-reality view includes a hologram at a real-world location in the real-world environment at which work associated with the step is to be performed. From each mixed-reality device, mixed-reality data is received based on use of at least the first mixed-reality guide on the mixed-reality (Continued)

device. The mixed-reality data includes spatial telemetry data collected for at least one step of the first mixed-reality guide. A presentation that is based on the mixed-reality data is provided. The first mixed-reality guide is enabled to be altered based on the mixed-reality data.

19 Claims, 7 Drawing Sheets

(51) Int. Cl.

| | |
|---|---|
| *G06F 3/01* | (2006.01) |
| *G06F 3/04845* | (2022.01) |
| *G06T 19/00* | (2011.01) |
| *G06T 19/20* | (2011.01) |
| *G02B 27/01* | (2006.01) |
| *G09G 5/37* | (2006.01) |
| *G09B 5/02* | (2006.01) |
| *G09B 19/00* | (2006.01) |
| *H04L 67/131* | (2022.01) |
| *G06F 3/16* | (2006.01) |
| *G06F 3/04842* | (2022.01) |
| *G06F 1/16* | (2006.01) |
| *G02B 27/00* | (2006.01) |
| *G06V 20/20* | (2022.01) |

(52) U.S. Cl.
CPC .............. *G06F 3/011* (2013.01); *G06F 3/012* (2013.01); *G06F 3/0482* (2013.01); *G06F 3/04845* (2013.01); *G06T 19/006* (2013.01); *G06T 19/20* (2013.01); *G09B 5/02* (2013.01); *G09B 19/003* (2013.01); *G09G 5/37* (2013.01); *H04L 67/131* (2022.05); *G02B 27/0093* (2013.01); *G02B 2027/0141* (2013.01); *G02B 2027/0174* (2013.01); *G02B 2027/0178* (2013.01); *G06F 1/163* (2013.01); *G06F 3/013* (2013.01); *G06F 3/017* (2013.01); *G06F 3/04842* (2013.01); *G06F 3/167* (2013.01); *G06T 2200/04* (2013.01); *G06T 2219/2004* (2013.01); *G06V 20/20* (2022.01); *G09G 2354/00* (2013.01)

(58) Field of Classification Search
CPC ...... G06F 1/163; G06F 3/04842; G06F 3/013; G06F 3/017; G06T 19/006; G06T 19/20; G06T 2200/04; G06T 2219/2004; G02B 27/0172; G02B 27/017; G02B 2027/0141; G02B 2027/0174; G02B 2027/0178; G02B 27/0093; G09G 5/37; G09G 2354/00; G09B 5/02; G09B 19/003; G06V 20/20; H04L 67/131

See application file for complete search history.

(56) References Cited

U.S. PATENT DOCUMENTS

| | | | |
|---|---|---|---|
| 2012/0249741 A1* | 10/2012 | Maciocci | G06T 15/503 |
| | | | 348/46 |
| 2013/0342571 A1* | 12/2013 | Kinnebrew | G02B 27/017 |
| | | | 345/633 |
| 2018/0158243 A1 | 6/2018 | Gleason et al. | |
| 2018/0165830 A1* | 6/2018 | Danieau | G06F 40/30 |
| 2018/0300952 A1* | 10/2018 | Evans | G06F 3/04845 |
| 2018/0336732 A1* | 11/2018 | Schuster | G06Q 10/063118 |
| 2018/0374268 A1* | 12/2018 | Niles | H04N 21/21805 |
| 2019/0094981 A1* | 3/2019 | Bradski | G06F 3/011 |
| 2019/0114485 A1* | 4/2019 | Chan | G11B 27/031 |
| 2019/0287304 A1* | 9/2019 | Davies | G06T 7/75 |
| 2019/0371030 A1* | 12/2019 | Roesler | G06F 3/04845 |
| 2020/0066050 A1 | 2/2020 | Ha et al. | |
| 2020/0138518 A1 | 5/2020 | Lang | |
| 2020/0226834 A1* | 7/2020 | LeFevre | G06F 3/016 |
| 2021/0049352 A1* | 2/2021 | Ihara | H04L 51/043 |

OTHER PUBLICATIONS

"Non-Final Office Action Issued in U.S. Appl. No. 16/426,715", dated Jun. 16, 2020, 15 Pages.
"Final Office Action Issued in U.S. Appl. No. 16/426,715", dated Oct. 16, 2020, 16 Pages.
"International Search Report and Written Opinion Issued in PCT Application No. PCT/US2020/017813", dated Jul. 14, 2020, 11 Pages.
"International Search Report and Written Opinion Issued in PCT Application No. PCT/US20/015757", dated Jul. 14, 2020, 11 Pages.
"Non Final Office Action Issued in U.S. Appl. No. 16/426,715", dated Mar. 26, 2021, 17 Pages.
"Final Office Action Issued in U.S. Appl. No. 16/426,715", dated Aug. 2, 2021, 18 Pages.
"Non Final Office Action Issued in U.S. Appl. No. 16/426,715", dated Nov. 29, 2021, 18 Pages.

* cited by examiner

MIXED-REALITY GUIDE DATA COLLECTION AND PRESENTATION

CROSS-REFERENCE TO RELATED APPLICATION(S)

This application claims priority to U.S. Provisional Pat. App. No. 62/808,848, filed Feb. 22, 2019, entitled "MIXED REALITY USER INTERFACE". The entirety of this aforementioned application is incorporated herein by reference.

BACKGROUND

Typically, mixed reality (MR) refers to a combination of virtual and real environments to produce new environments and visualizations where physical and digital objects co-exist and can be interacted with in real time. Typically, mixed reality takes place not only in the physical world or the virtual world, but includes a mix of elements from reality and virtual reality, encompassing both augmented reality and augmented virtuality via immersive technology.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to mixed-reality devices. In one example of the technology, a first mixed-reality guide is provided to each mixed-reality device of a set of mixed-reality devices, enabling the mixed-reality devices of the set of mixed-reality devices to operate the first mixed-reality guide while providing a mixed-reality view, such that: while the first mixed-reality guide is navigated to a step of the set of steps of the first mixed-reality guide, the mixed-reality view includes a hologram at a real-world location in the real-world environment at which work associated with the step is to be performed. In some examples, from each mixed-reality device of a set of mixed-reality devices, mixed-reality data is received based on use of at least the first mixed-reality guide on the mixed-reality device. In some examples, the mixed-reality data includes spatial telemetry data collected for at least one step of a set of steps of the first mixed-reality guide. In some examples, a presentation that is based on the mixed-reality data is provided. In some examples, the first mixed-reality guide is enabled to be altered based on the mixed-reality data.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
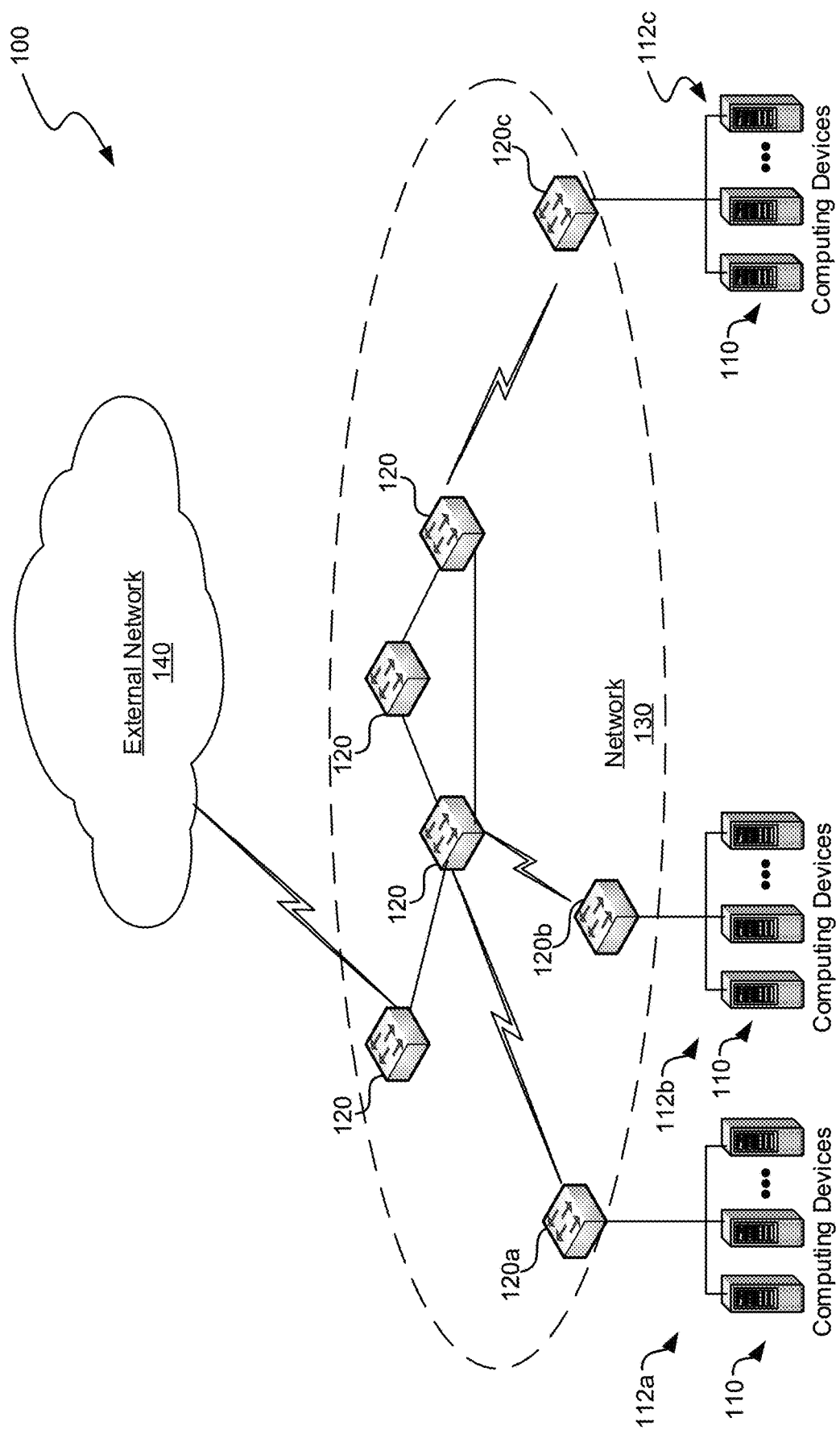
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to mixed-reality devices. In one example of the technology, a first mixed-reality guide is provided to each mixed-reality device of a set of mixed-reality devices, enabling the mixed-reality devices of the set of mixed-reality devices to operate the first mixed-reality guide while providing a mixed-reality view, such that: while first the mixed-reality guide is navigated to a step of the set of steps of the first mixed-reality guide, the mixed-reality view includes a hologram at a real-world location in the real-world environment at which work associated with the step is to be performed. In some examples, from each mixed-reality device of a set of mixed-reality devices, mixed-reality data is received based on use of at least the first mixed-reality guide on the mixed-reality device. In some examples, the mixed-reality data includes spatial telemetry data collected for at least one step of a set of steps of the first mixed-reality guide. In some examples, a presentation that is based on the mixed-reality data is provided. In some examples, the first mixed-reality guide is enabled to be altered based on the mixed-reality data.

The term "mixed reality" or "mixed-reality," as used herein throughout the specification and the claims, fully encompasses at least "augmented reality."

Operators may wear wearable mixed-reality devices, such as a head-mounted display mixed-reality device, that provides the operator with a mixed-reality view. Each operator may use the mixed-reality device to access one or more mixed-reality guides. Each guide may be a guide for a task that is divided into steps for accomplishing the task. A task may be, for example, an assembly task in a manufacturing setting. Each operator may open a guide, begin with the first step of the task of the guide, and navigate to the next step of the task after completing the current step of the task, and so on, until the task is completed.

For each step, an instruction step card may be provided in the mixed-reality view that indicates one or more instructions for the current step of the task. The instruction step card may provide various selectable options, including options for going back to the previous step and proceeding to the next step. For each step of the task of the guide, one of more three-dimensional holograms may be provided at real-world locations in the real-world environment, including at the real-world location where work is to be performed for the step.

While operators use mixed-reality guides on mixed-reality devices, the sensors on the mixed-reality device may receive, track, and store various data, including, among other things, spatial telemetry data. The spatial telemetry data may include, for example, movement of the operators through the space, eye movement, hand movement, and/or the like. The various data collected by mixed-reality devices may be received by another device, which may process the data in various ways, including amalgamating the data and performing analytics on the data. In some examples, analytics may be used to analyze the usage of guides across the organizations. The analytics may capture various data points, including, for each operator, what the operator is doing or how efficient the operator is, time spent on a step, where the operator was looking, failure to complete a step, the fact that a user stopped on a step, and various other interactions between the operator, the mixed-reality device, and the physical environment.

Presentations, such as reports, may be created for operators and for managers based on the analytics, for example to help answer high-level questions about guides usage, such as how many guides have been used to date, whether the number of times a guide is run per day increasing, decreasing, or remaining stable over time, and which guides take the most time to complete. The reports may include a heat map for each step of each guide. In some examples, the heat map shows the movement of each operator, with the color indicating the frequency with which operators moved on a particular path—besides movement of the operator through the space, the heat map may show eye movement, hand movement, and/or the like.

Various action items may be taken based on information gained from the analytics, including training, updating the instructions, and/or alerting for safety infractions. In some examples, as part of the analytics for the guides, smart dashboards cause important data to be flagged, and surfaced to the appropriate person.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112*a*-412*c*. In the illustrated example, each of host sets 112*a*-412*c* is operatively coupled to a corresponding network node 120*a*-420*c*, respectively, which are commonly referred to as "top-of-rack" or "TOR" network nodes. TOR network nodes 120*a*-420*c* can then be operatively coupled to additional network nodes 120 to form a computer network in a hierarchical, flat, mesh, or other suitable types of topology that allows communications between computing devices 110 and external network 140. In other examples, multiple host sets 112*a*-412*c* may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Although FIG. 1 shows an example of a device in a network environment, not all examples of the disclosure are network devices. That is, some examples of the disclosure are capable of operating as connected devices that communicate with one or more networks, and some examples of the disclosure are not capable of connecting to a network.

Illustrative Computing Device

Figure 2:
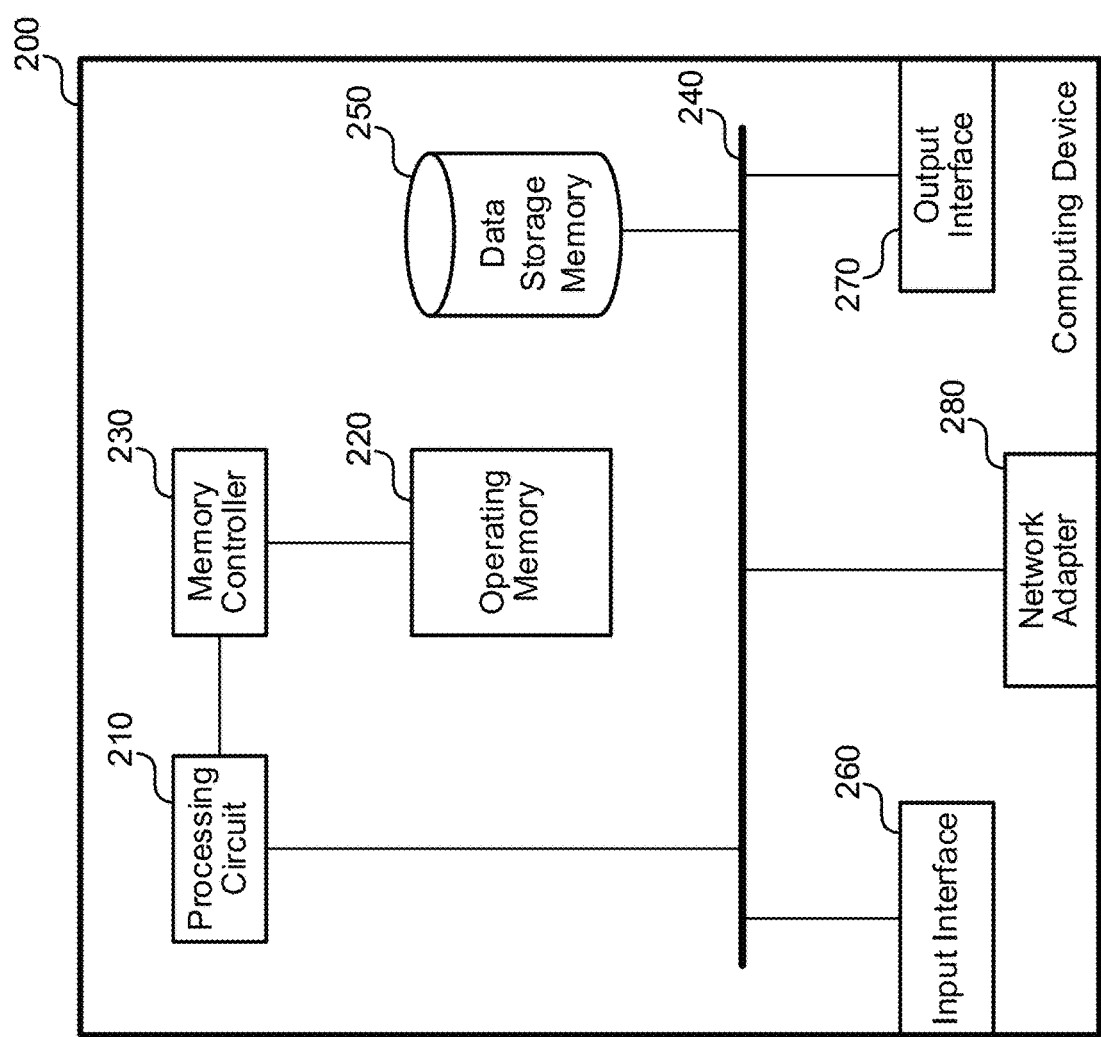
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device no or network node 120 of FIG. 1. Computing device 200 may also be an IoT device that connects to a network to receive IoT services. Likewise, computer device 200 may be an example any of the devices illustrated in or referred to in FIGS. 3-6, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In some examples, operating memory 220 does not retain information when computing device 200 is powered off. Rather, in some examples, computing device 200 is configured to transfer instructions from a non-volatile data storage component (e.g., data storage component 250) to operating memory 220 as part of a booting or other loading process.

Operating memory 220 may include 4$^{th}$ generation double data rate (DDR4) memory, 3$^{rd}$ generation double data rate (DDR3) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
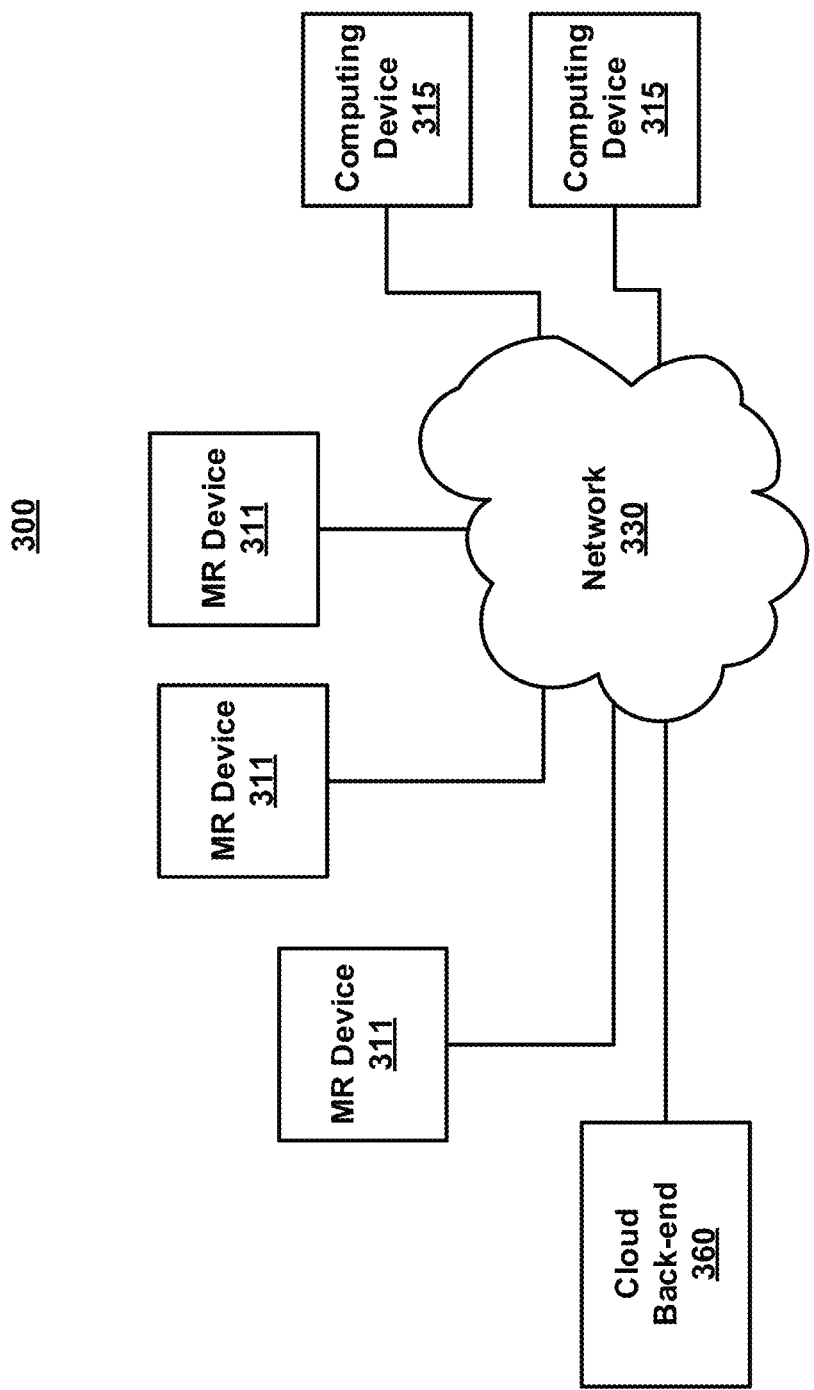
FIG. 3 is a block diagram illustrating an example of a system.

FIG. 3 is a block diagram illustrating an example of a system (300). System 300 may include network 330, as well MR devices 311, computer devices 315, and cloud back-end 360, which may each connect to network 330.

MR devices 311 and computing devices 315 may each include an example of computing device 200 of FIG. 2. Although two computing devices 315 are illustrated in FIG. 3, in various examples, there may be one computing device 315, three or more computing devices 315, and/or the like. Similarly, there may be more or less MR devices 311 than literally illustrated in FIG. 3. In some examples, many MR devices 311 may be included in system 300, for which data is amalgamated and analytics is performed upon. Application back-end 360 refers to a device, or multiple devices such as a distributed system, that may assist in providing functionality to MR devices 311 and/or computing devices 315 via communication over network 330. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication technology by which information may travel between MR devices 311, computing devices 315, and cloud back-end 360. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Each computing device 315 may perform various functions in conjunction with MR devices 311, and each computing device 315 may be capable of communicating over network 330 with MR devices 311 and cloud back-end 360. As discussed in greater detail below, one of the computing devices 315 may be used to assist in the creation of guides for MR devices 311, to perform and/or view analytics associated with MR devices 311, and/or the like.

Each MR device 311 may include any suitable MR device such as a wearable mixed-reality device, or other suitable MR device. Some examples of MR device 311 may be a head-mounted display unit connected to an adjustable inner headband. Some examples of MR device 311 may include a self-contained holographic computer that enables a user to engage with digital content and interact with holograms while simultaneously viewing the real world. Some examples of MR device 311 may include cameras, processors, lenses, 3D audio speakers, a battery, and various specialized components such as multiple sensors, advanced optics, and a custom holographic processing unit. Some examples of MR device 311 may include physical buttons on the side which may be pressed to actuate various functions.

Some examples of MR device 311 may communicate with cloud back-end 360 to provide certain functions associated with MR device 311. Other examples of MR device 311 provide full functionality within MR device 311 without requiring communication with cloud back-end 360, and cloud back-end 360 is not included in system 300 in some examples. In some examples, one or more of MR devices 311 are network-connected, and in other examples, one or more MR devices 311 are not network-connected.

Each MR device 311 may allow a user to simultaneously view the real world and virtual objects. The user may also be able to manipulate the virtual objects in various ways. The user may also be able to view applications in the mixed-reality view provided by MR device 311.

System 300 may include more or less devices than illustrated in FIG. 3, which is shown by way of example only.

Figure 4:
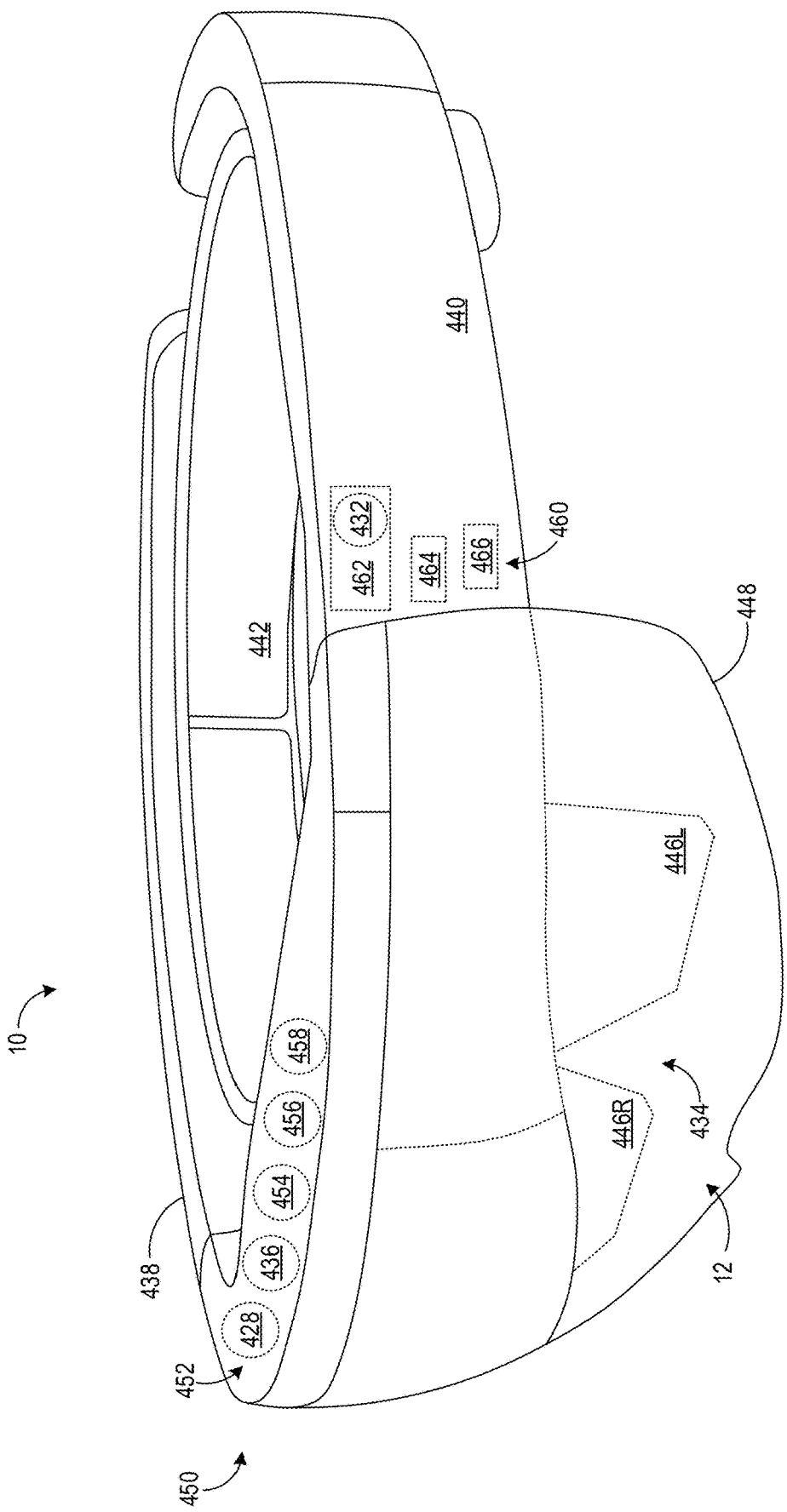
FIG. 4 is a diagram illustrating an example mixed-reality (MR) device.

FIG. 4 illustrates an example of computing device 10, which may be employed as an example of MR device 311 of FIG. 3 and/or computing device 200 of FIG. 2. In the example computing device 10 of FIG. 4, the computing device 10 is a head-mounted display (HMD) device. The illustrated computing device 10 takes the form of a wearable visor, but it will be appreciated that other forms are possible, such as glasses or goggles, among others. The computing device 10 may include a housing 438 including a band 440 and an inner band 442 to rest on a user's head. The display 12 of the computing device 10 may include the at least partially see-through display 434. The at least partially see-through display 434 may be a stereoscopic display and may include a left panel 446L and a right panel 446R as shown, or alternatively, a single panel of a suitable shape. The panels 446L, 446R are not limited to the shape shown and may be, for example, round, oval, square, or other shapes including lens-shaped. The computing device 10 may also include a shield 448 attached to a front portion 450 of the housing 438 of the computing device 10. The at least partially see-through display 434 and/or the shield 448 may include one or more regions that are transparent, opaque, or semi-transparent. Any of these portions may further be configured to change transparency by suitable means. As such, the computing device 10 may be suited for both augmented reality situations and virtual reality situations.

A controller 460 of the computing device 10 may include a logic subsystem 462, a storage subsystem 464, and a communication subsystem 466. The logic subsystem 462 may include one or more processors 432 configured to execute software instructions. A processor of the one or more processors 432 may an example of processing circuit 210 of FIG. 2, and the storage subsystem 464 may include an example of operating memory 220 of FIG. 2.

In some examples, the processor 432 of the computing device 10 is operatively coupled to the display panels 446R and 446L and to other display-system componentry. In some examples, the processor 432 includes logic and associated computer memory configured to provide image signals to the display panels 446R and 446L, to receive sensory signals from a sensor system 452, and to enact various control processes described herein. The sensor system 452 may include one or more location sensors 428, one or more optical sensors 436, a gaze detection system 454, one or more microphones 456, as well as one or more speakers 458. One or more optical sensors 436 may include one or more cameras. The processor 432 may be further configured to provide signals to the sensor system 452.

Display 12 may be configured to display holograms superimposed on a physical environment. Display 12 may be a stereo display that is at least partially see-through, and the hologram may be positioned to appear at a desired depth and position within the user's field of view. Alternatively, in some examples, display 12 includes a display of a portable camera-equipped computing device and the image may be superimposed on an image of the physical environment captured by the camera. In some examples, the processor 432 is configured to store a representation of the physical environment 30 in non-volatile memory 16. The processor 432 may be configured to generate the representation of the physical environment based on inputs received from a sensor system 452.

Figure 5:
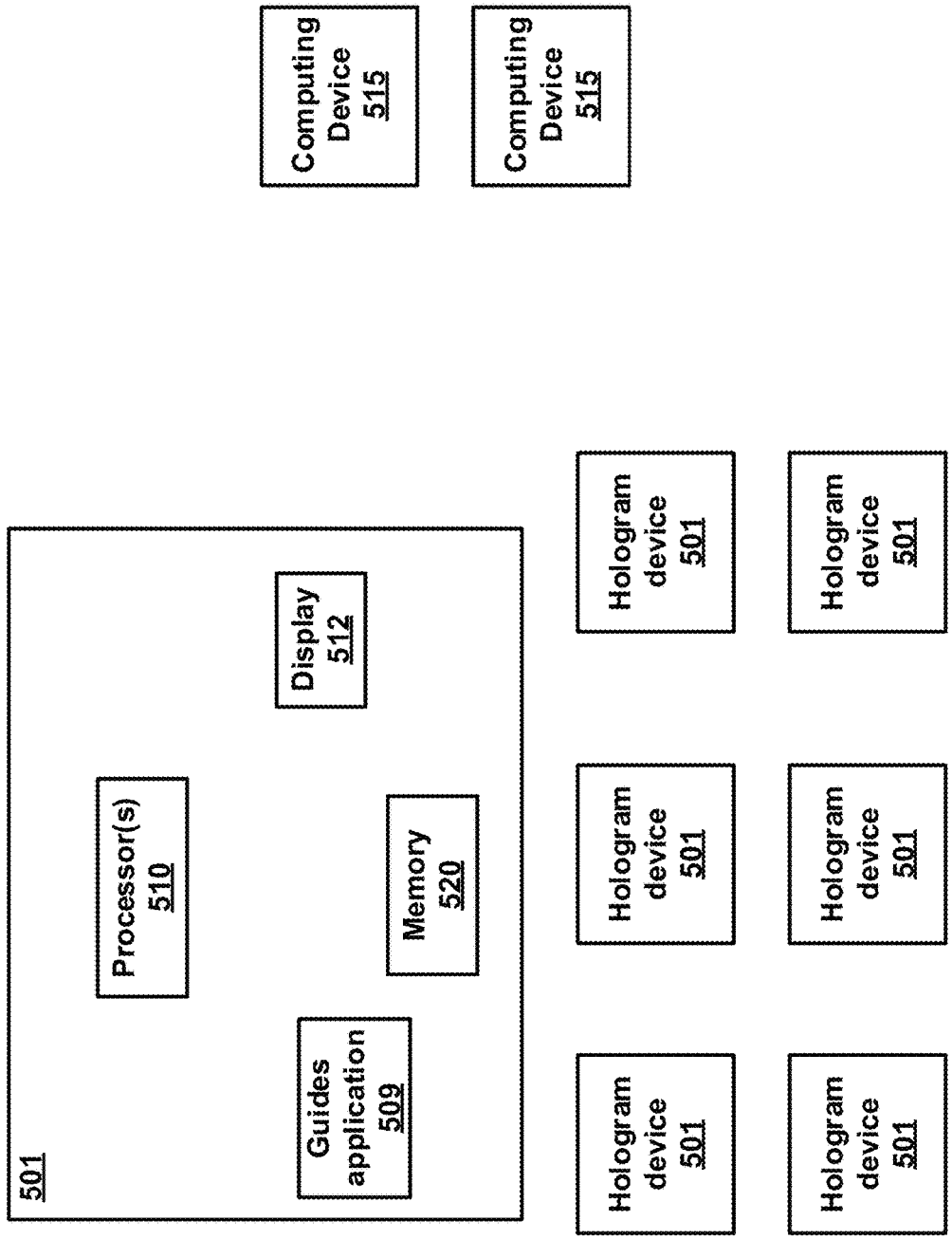
FIG. 5 is a diagram illustrating another example system including hologram devices.

FIG. 5 illustrates an example system (500) including hologram devices 501 and computing devices 515. Each of the computing devices 515 may be an example of computing device 200 of FIG. 2 and/or one of the computing devices 110 of FIG. 1. Although two computing devices 515 are illustrated in FIG. 5, in various examples, there may be one computing device 515, three or more computing devices 515, and/or the like. Similarly, there may be more or less MR devices 511 than literally illustrated in FIG. 5. In some examples, many MR devices 511 may be included in system 500, for which data is amalgamated and analytics is performed upon. In some examples, each hologram device 501 is a computing device that, among other things, provides means for a user to view and interact with holograms. Each Hologram device 501 may, for instance, be a mixed-reality device, such as MR device 311 of FIG. 3 or MR device 10 of FIG. 4. Each hologram device 501 may be an example of computing device 200 of FIG. 2, MR device 311 of FIG. 3, and/or computing device 10 of FIG. 4.

Each hologram device 501 may include one or more processors 510, operating memory 520, display 512, and guides application 509. One or more processors 510 may be configured to execute instructions, such as instructions for implementing the herein-described workloads, processes, or technology. The instructions may include guide application 509. The aforementioned instructions, along with other data (e.g., datasets, metadata, operating system instructions, etc.), may be stored in operating memory 520 during run-time of hologram device 501. Display 512 may be configured to display holograms to a user of hologram device 501. In some examples, hologram device 501 is a head-mounted display mixed-reality device, other wearable mixed-reality device, or other suitable mixed-reality device.

Many aspects of hologram device 501 are discussed below that may be used in conjunction with each other, or separately. That is, some examples may include all of the aspects of hologram device 501 discussed below, some examples may include but one of the aspects of hologram device 501 discussed below, and some example may include some, but not all, of the aspects of hologram device 501 discussed below. Further, while many aspects of hologram device 501 are discussed in the context of guides application 509, the aspects are not limited to use with guides application 509, and may be applied to various functions provided by hologram device 501 outside of guides application 509. Some examples of hologram device 501 do not include guides application 509, and various of the aspects may be used by hologram device 501 even though hologram device 501 does not include guides application 509. Each computing device 515 may perform various functions in conjunction with guides application 509, such as the authoring and editing of guides, performing analytics for one or more hologram devices 501, and/or the like.

Operators may wear wearable mixed-reality devices, such as a head-mounted display mixed-reality device, that provides the operator with a mixed-reality view. Each operator may use the mixed-reality device to access one or more mixed-reality guides. Each guide may be a guide for a task that is divided into steps for accomplishing the task. A task may be, for example, an assembly task in a manufacturing setting. Each operator may open a guide, begin with the first step of the task of the guide, and navigate to the next step of the task after completing the current step of the task, and so on, until the task is completed.

For each step, an instruction step card may be provided in the mixed-reality view that indicates one or more instructions for the current step of the task. The instruction step card may provide various selectable options, including options for going back to the previous step and proceeding to the next step. For each step of the task of the guide, one of more three-dimensional holograms may be provided at real-world locations in the real-world environment, including at the real-world location where work is to be performed for the step.

While operators use mixed-reality guides on mixed-reality devices, the sensors on the mixed-reality device may receive, track, and store various data, including, among other things, spatial telemetry data. The spatial telemetry data may include, for example, movement of the operators through the space, eye movement, hand movement, and/or the like. The various data collected by mixed-reality devices may be received by another device, which may process the data in various ways, including amalgamating the data and performing analytics on the data. In some examples, analytics may be used to analyze the usage of guides across the organizations. The analytics may capture various data points, including, for each operator, what the operator is doing or how efficient the operator is, time spent on a step, where the operator was looking, failure to complete a step, the fact that a user stopped on a step, and various other interactions between the operator, the mixed-reality device, and the physical environment.

Presentations, such as reports, may be created for operators and for managers based on the analytics, for example to help answer high-level questions about guides usage, such as how many guides have been used to date, whether the number of times a guide is run per day increasing, decreasing, or remaining stable over time, and which guides take the most time to complete. The reports may include a heat map for each step of each guide. In some examples, the heat map shows the movement of each operator, with the color indicating the frequency with which operators moved on a particular path—besides movement of the operator through the space, the heat map may show eye movement, hand movement, and/or the like.

Various action items may be taken based on information gained from the analytics, including training, updating the instructions, and/or alerting for safety infractions. In some examples, as part of the analytics for the guides, smart dashboards cause important data to be flagged, and surfaced to the appropriate person.

Guides application 509, responsive to execution in hologram device 501, may be a mixed-reality application that provides guidance with real world activities via holograms. For instance, in some examples, guides application 509 may provide holographic instructions when and where they are needed. This may be used to enable an operator to receive step-by-step instructions on new tasks, may act as a checklist for a task that is familiar to the operator, or the like.

In some examples, guides application 509 may enable increased productivity in a workforce by enabling the workforce to learn while doing their work. For instance, some examples of guides application 509 enable employees to learn in the flow of work by providing holographic instructions when and where they need them. Guides application 509 may be used in a variety of different contexts, including performing an operation, such as assembly in a manufacturing setting as but one example. In some examples, a series of step-by-step instruction cards with image and video support are visually tethered to the real-world place where the work needs to be done. A digital object may also exist at the tether location. In some examples, additional guidance in the form of holographic models shows what needs to be done where, so workers can get the job done faster, with fewer errors and greater retention of learned skills, and help reduce the cognitive load of workers.

Guides application 509 may provide authoring tools for the creation and adding of guides to be subsequently used by used to complete the process for which the authored guide provides guidance. In some examples, work processes are captured using the authoring tool to create guides, which, in some examples, are files that include step-by-step instructions with images, video, and/or 3D holograms.

In some examples, the authoring tools may be used to create or partially create the guides on one of the computing devices 515, which may be a device separate from hologram device 501, and then the guides can be transferred to holographic device 501, to complete the guides, and for subsequent use of the guides by operators. In some examples, an author can use the author tools to create a guide on one of the computing devices 515, which may be a personal computer or other computing device. Using the author tools, in some examples, an author can begin authoring a guide using the author tools on one of the computing devices 515, transfer the guide to hologram device 501, and then, using guide application 509 via hologram device 501, connect the instruction cards and holograms to the physical work space using hologram device 501 by simply picking up and moving the instruction cards and holograms to the correct locations. In some examples, files, including the guide, are synchronized across several devices, including computing device 515 and hologram device 501, so that, rather than explicitly transferring the file from computing device 515 to hologram device 501, the guide will also be present on hologram device 501 via the file synchronization.

Guides application 509 may enable an improved training system. Typically, training occurs away from the flow of work in a training facility, and then requires a buddy system with experienced mentors to bring workers up to speed. Typically, some complex procedures are not needed regularly, and just-in-time training is needed. Typically, task cards and standard operating procedures are on paper or a 2D device that requires an operator to read, process, and then do.

In contrast, guides application 509 may enable operators to learn a task or be informed of updated instructions while in the flow of work. Guides application 509 may be used for complex procedures on the job or while training away from the production line, providing heads-up, hands-free, step-by-step instruction in the flow of work. Guides application 509 may enable operators to control the interface with their gaze—for example, using a glance to move to the next step—leaving their hands free to do the work.

In some examples, instruction cards move with the worker, following them as they move around equipment, pointing to the tools and parts they need and showing them exactly how and where to apply them. In some examples, the experience is comfortable, simple to use, and may reduce mental processing time, errors, and the need to rely on a buddy system. In some examples, using a guide via guides application 509, an operator can confidently work through steps of the associated process using a reliably anchored and ergonomic interface.

In some examples, processes associated with the guides of guides application 509 may be analyzed and improved. In some examples, analytics may be performed and viewed on one or more devices that are external to hologram device 501. In some examples, the analytics may include presentations, including dashboards which by which a user or their manager can see rich data about how the process associated with a guide is working for end users, enabling continual analysis and improvement without doing expensive studies. In some examples, the presentations provided by analytics include real-time dashboards that may provide information about what was done and by who, and how it was done, which may enable confident iteration of a process.

In some examples, a user may use a holographic guide via guides application 509 using hologram device 501 as follows. In some examples, the user may first calibrate hologram device 501. The calibration may be used to ensure that holograms are properly aligned to the environment. For instance, a guide might be used to assemble a door in a commercial aircraft. Without proper calibration, a user might drill a hole in the wrong place or assemble the wrong part. In some examples, guides application 509 may include multiple applications, including a calibration application. In some examples, the calibration application may lead the user though the calibration process step by step. In some examples, the user's interpupillary distance (IPD) may be determined as part of the calibration, or the IPD may be set prior to the calibration.

In some examples, one or more of gaze, gestures, and/or voice commands may be used to navigate through a guide, including navigate through steps of a task of a guide.

In some examples, a guide may be navigated by gazing at an item, where the item may be, for example, an app, menu, or button. In some examples, the user's gaze may be in the center of the user's view, and indicated via a visual indicator such as a cursor dot or the like. In some examples, dynamic cursor visuals may be used for the gaze cursor when suitable. For instance, in some examples, when the user's gaze is on a button, the gaze cursor is replaced with a spotlight effect on that button. In some cases, a user can select an item by gazing at a selection box. In some examples, the select does not occur immediately; rather, a selection is made responsive to a user's gaze dwelling in the selection box. For instance, in some examples, when the user's gaze enters a selection box, a dwell timer begins, and the selection is made if the user's gaze remains in the box for the entirety of the dwell timer.

In some examples, when the user's gaze enters the selection box, the box begins filling to indicate a select in progress, and the item is selected when the box is filled, which occurs if the gaze remains in the box for the entirety of the dwell timer, with the filling box providing the user with a visual display of the dwell timer. In some examples, a sound is also provided while the box is being filled to indicate that a selection is in process. Selection of an item via gaze may be extremely helpful the user's hands are occupied with tools or parts. In some examples, when a selection box on the Step card is being filled, it is ensured that the Step card does not move.

In other cases, a user may use gaze to target an object, and then act on the target with a gesture. In some examples, a bloom gesture may be used to open or close a pre-determined menu, such as the high-level menu for a guide. In these examples, when a user is uncertain of what to do, the bloom gesture may be a good way for the user to get oriented. In one example, to do the bloom gesture, the user will hold out the user's hand with the user's palm up and fingertips together, and then the user opens the user's hand.

In some examples, as discussed above, an app or other hologram may be selected in multiple ways, including with a gesture. In some examples, the air tap gesture may be used to open a hologram. In some examples, a user may select a hologram with an air tap by gazing at a hologram, holding the user's hand straight in front of the user in a loose fist, and then pointing the user's index finger straight up toward the ceiling, then tapping the user's finger down, and then quickly raising the user's index finger back up again.

In some examples, a user can interact with the holographic environment in different ways, which may vary based on user preferences, or based on the particular circumstances. For example, in some circumstances, a user's hands may not be free to perform gestures, and in some circumstances, the environment be too noisy for voice commands. For instance, in some examples, to perform a selection, a user may use an air tap gesture, may use a voice command (such as saying "select"), or may select with gaze (such as by moving the user's gaze to the corresponding selection box and leaving it there until the selection box if filled). In some examples, a user may say "Next step" to go to the next step, as an alternative to selecting the "next step" button. In some examples, selectable buttons may also include an indication of the voice command that may be used to select the button. For instance, in some examples, the "Next Step" button includes text at the bottom of the Next Step button that says, "Say 'Next Step.'" In some examples, other mechanisms may also be included for going to the next step, as discussed in greater detail below.

In some examples, an operator of hologram device 501 may begin using hologram device 501 to perform tasks by first calibrating hologram device 501, and then opening a guide. In some examples, once a guide is open, the guide first contains alignment instructions. The operator may then align the guide by following the alignment instructions. Aligning the guide may be used to ensure that the holographic instructions line up with the real-world environment. In some examples, some guides may include a marker alignment, which uses a hologram marker that looks just like a printer marker that is in the real-world environment. In some examples, the operator aligns the guide by finding the printed marker in the real-world environment, aligning the hologram marker with the printed marker, and then confirming the alignment.

In some examples, the alignment may be accomplished with a manual alignment rather than a marker alignment. In some examples, to perform manual alignment, the operator uses a gesture to align the guide to a digital 3D representation laid over a physical object in the work area. For instance, in some examples, if the author of the guide chose manual alignment when the author created the guide, the operator would align a hologram with a digital 3D representation of the same object in the real world.

The above examples of alignment are for illustrative purposes only. In various examples, the alignment may be accomplished in a variety of different suitable manners.

In some examples, after an operator opens a guide, and performs alignment, if necessary, the operator will then see the first Step card of the guide that is provided as a hologram as part of the mixed-reality view. The holographic Step card may be a two-dimensional hologram or a three-dimensional hologram. In some examples, the Step cards provide the instructions that an operator follows to complete a task. In some examples, the Step card also includes two buttons used to navigate through a guide—the Next Step and Go Back buttons. In some examples, once an operator completes a step, the operator can select the Next Step button to go to the next step, and so on, until all of the steps in the guide are completed. In some examples, there may also be other various mechanisms by which an operator may advance to the next step, as discussed in greater detail below. In some examples, each step has a corresponding Step card that includes one or more instructions for that step. In some examples, as the operator goes through the steps in a task, the Step card "tags along" with the operator via hologram device 501 to keep the instructions in a location that is useful to the operator.

In some examples, in addition to the Next Step and Go Back buttons, the Step card includes a number of different buttons and user interface (UI) elements to help the operator take various actions.

In some examples, the Step card includes a Task/Guide progress bar. In some examples, the Task/Guide progress bar indicates where the operator is within a task, and within the entire guide. In some examples, the operator can leave a task midway (by using the bloom gesture) and come back to the same position in the guide during a run. In some examples, progress is saved during this step and the operator can start from where the operator left off, unless the operator closed the application.

One example of a description of the buttons and other UI elements on the Step card are as follows, with some of the function discussed in more detail elsewhere:

| Button or UI element | Description |
|---|---|
| Home | Choose a different guide |
| Settings | Access to settings. |
| Profile | Sign in and out. |
| Alignment | Realign your guide. Hologram device 501 may sometimes lose tracking, which causes holograms to be misaligned. To fix this, you can realign the guide by gazing at a printed marker or digital 3D representation again. |
| Pin | Lock the Step card in place. This is useful if you want to keep the Step card in one location while you complete the step or task. |
| Outline | Go to the Outline. Use the Outline to quickly navigate around your guide. |
| Task/Guide progress | Shows where you are within a task, and within the entire guide. |
| Media | Close the image or video associated with the step. (If there's an image or video associated with a step, it appears automatically when you go to that step.) |

In some examples, Step cards are linked by holographic tethers to physical areas in the work area. In some examples, a tether is a holographic link that ties a step visually to an area, object, or the like that is relevant to the step. A tether may help the operator find the area where the operator needs to take an action. In some examples, the tether is a dashed white line leading from the step card to an area, object, or the like that pertains to the step indicated on the Step card. In these examples, although the tether is a line, the line is typically curved. The operator may follow the tether to find the physical area where the operator needs to do the work, and then, once the work is completed, or when the operator needs to refer back to the step, follow the tether back to the Step card to read the instructions. If the tether points behind the operator, then the operator may step to the side and then continue to follow the tether. In some examples, the tether may go through real world objects.

In various examples, the tether location may be a fixed location in the real-world, at which a 3D hologram may exist, or the tether location may be the location of the 3D hologram, where the hologram is situated meaningfully in the real world, such that if the 3D hologram is moved, the tether location is moved accordingly. In this way, in these examples, the tether location may be a fixed real-world location or a meaningful spatially situated instruction hologram such as an arrow, zone, or 3D computer-aided design (CAD) file overlaid on top of a real physical object.

In some examples, tether avoidance is used. With tether avoidance, in some examples, the tether avoids the operator, does not go through walls, and the like. Various other forms of intelligent routing are used in various examples. In some examples, the line is kept in sight level as opposed to forcing the operator to move the operator's head up and down to visually follow the tether, because the vertical line sight may be limited without forcing the operator to move his head up or down to see the tether.

In some examples, the tether serves to tether instructions to the real world. In this way, in these examples, an operator may follow the tether in order to look at what the instructions are referring to in the real world. Instructions may also be useful if an operator returns to the task—the operator may follow the tether to return to a work area. The tether may link the Step card to the real-world location at which work is to be performed for the step. There may also be a three-dimensional hologram at the real-world location at which work is to be performed for the step. For instance, if a part is to be installed in a machine during the step, the tether may connect the step card to the location where the part is to be installed, with, at the location, a three-dimensional hologram of the part that is to be installed, as the part will appear once the part has been installed.

In some examples, as default behavior, wherever the operator looks, the Step card follows the operator's gaze—that is, the Step card "tags along" with the operator's gaze. In this way, the operator does not have to worry about where the instructions are while working. In some examples, the Step card only follows the operator's gaze when the operator indicates significant intention to move to a new area. This may be accomplished in different ways in different examples. In some examples, the card does not move when the operator is in the process of selecting buttons on the card. In some examples, there is a safe zone around the card, which may, in some examples, be a pie shape at a particular angle. In some examples, if the operator's gaze crosses the threshold of the pie shape, a timer is started, such as a two-second timer. In some examples, if the operator's gaze remains outside of the pie shape for the duration of the timer, then the Step card moves to the new location of the operator's gaze. In some examples, the safe zone is dynamically adjusted based on one or more factors. For instance, in some examples, the safe zone may be adjusted based on whether other content, such as media, is present.

The gaze determination is not necessarily limited to the angle of the operator's gaze, but may also be based on other aspects of the operator's gaze and/or the operator's head movements. For example, the gaze determination is not necessarily limited to the spot at which the operator is gazing, but also to where the user's head is relative to the spot at which the operator is gazing. For example, if the operator's gaze moves to a lower position, the tag-along behavior of the card may vary depending on whether the user's head remained in the same position with the user looking downward at the lower spot, or whether instead the operator squatted down, keeping his gaze at the same angle but looking at a lower spot due to the operator's head being at a lower position.

In some examples, certain rules are used for the Step card regardless of the Step card's movement. For instance, in some examples, the Step card is prevented from moving while a selection box on the Step card is filling as a result of gaze. In some examples, the instruction card is kept at a minimum forwards distance threshold from the operator. For instance, in some examples, the minimum forwards distance threshold may be the minimum focal distance away from the operator, such as at least 2.1 meters away from the operator according to one example. For instance, in some examples, if the operator moves closer to the Step card than the minimum forwards distance threshold, the Step card will move backward to maintain the minimum distance.

In some examples, the entire Step card is kept in the operator's view when appropriate. As discussed above, the Step card may be left out of the operator's view when the operator's gaze has moved but the operator has not indicated an intention to move the operator's view to a new area. In some examples, it is ensured that, whenever the Step card is out of the operator's view, wherever the operator looked last, it is ensured that the Step card is already be there where the operator looked last, or be moved into the operator's view after a short period of time responsive to the operator returning the user's view to the location where the operator looked last.

In some examples, if the operator moves backward, a determination will be made as to whether the instruction card is in the operator's view. If so, in these examples, a determination is made as to whether the distance from the operator to the Step card is greater than a particular threshold, such as 3.1 meters. If so, in these examples, the Step card is moved toward the operator so that that the Step card is a distance equal to the minimum forwards distance.

Some previous examples above involved a safe zone, that may be a cone shape or the like, in which a timer begins responsive to the operator's view leaving the safe zone, and in which the Step card moves into the operator's current view responsive to the operator's view remaining outside of the safe zone for a threshold period of time. However, in some examples, horizontal rotation and vertical rotation are treated differently. For instance, in some examples, responsive to the view of operator rotates horizontally more than a threshold number of degrees, a timer starts, and responsive to the view of the operator remaining beyond the threshold horizontal angle for a determined period of time, the Step card moves to the center of the user's view. In some examples, responsive to the operator's view rotating vertically by more than a vertical angle threshold, the horizontal angle threshold is deactivated. In some examples, the threshold horizontal angle is 29.5 degrees, and the threshold vertical angle is 3 degrees. In some examples, the threshold angles may be fixed, and in other examples, the threshold angles may be dynamic. As discussed above, in some examples, the detected angle is determined not just based on a change of the gaze position, but also on head movement. For instance, some examples, if the user's gaze is on a lower position because the user squatted down, but the user is looking at the same angle, this does not count as a change in vertical angle of the user's view. In contrast, in these examples, if the user's head remains in the same position but the operator's gaze is on a lower spot, this counts as a change in the vertical angle of the user's view.

In some examples, responsive to the operator squatting more than a particular distance such that the user's gaze is in a correspondingly lower position, a timer begins. In some examples, responsive to a particular time expiring with the operator still so squatting, the Step card moves to the new position of the user's gaze. In some examples, the timer for squatting is different than the timer for horizontal location. The thresholds for squatting, including the squatting distance and the timer, may be fixed or dynamic in various examples.

In some examples, the tag-along feature functions such that the Step card does not get in the operator's way. For instance, in some examples, if an operator looks down at a wiring assembly, the card stays in front of the operator at an ergonomic head height, so as to not obscure the view of the operator while the operator is working. In some examples, the step card also adjusts its position vertically based on the operator's height, so as to adjust for different heights, whether the operator is assuming a kneeling position, or the like.

In some examples, an author may choose to have particular steps of a guide be placed in a "preferred position," which, by default, overrides the tag-long features in some examples, in which the author has chosen to place the Step card in a preferred position for a particular step. For instance, in some examples, an author may have chosen to place a Step card in a "preferred position" by a specific engine part, component, or place that is hard to get into, such as requiring the operator to lay on the operator's back or the like.

In some examples, the tag-along feature of the step card and the tethering of the step card to the real-world are two behaviors that operate together in a combined way to provide a synergetic effect based on this combination of behaviors, to enable dynamic work and to provide other benefits. For instance, in some examples, matter how much a user moves, bends, ducks, spins around, the instruction text is always in front of the user. Further, in some examples, manufacturing workflows are highly dynamic so the step card always keeps up with a very active worker whose hands are full, and the step card is easy to read, always a glance away, easy to navigate between steps activating hands-free with gaze cursor. Further, with these combined behaviors, the 3D hologram(s) at the end of the tether are always perfectly locked where the work takes place. Accordingly, in this way, in these examples, no matter where the user reads the instructions, the user can always reliably follow tether to see the 3D hologram(s) at the end of the tether. Further, with this combined behavior, in some examples, as the user moves between steps, the users is always by the steps even as the user moves around. In these examples, because each step is represented with 3D hologram(s), the 3D hologram(s) can be in a new or different spot in the workshop or on the machine.

Further, the combination of two behaviors of the step card tag-along and the tethered holograms enable instructions to keep up with the operator, while still pointing to where the work takes place to enable factory work—the operator needed not maintain text position and tediously "drag them around manually," and the tether 3D hologram(s) do not require the operator to look for the 3D hologram(s) all of the time. In this way, in these examples, instructions that are always with the operator, that point to where to work, act as a combined hybrid interface.

For instance, the following non-limiting example may help illustrated an example of the combined behaviors and benefits thereto, for the purpose of illustration. A user standing in middle of shop, with instructions in front of the operator, and a 3D hologram attached to machine. The user then walks to machine. As the user walks to the machine, the instructions move with and in front of user as the user walks, and the 3D hologram stays attached to machine and does not move. The user then looks at next step button on the Step card. The instructions respond to user gaze cursor at comfortable angle. A tether leads from the Step card to a 3D hologram of arrow pointing at tool to use at back of room. The user then walks to back of room. The instructions move with and in front of user as the user walks. The 3D hologram of the arrow on the tool stays attached to tool, and does not move. The user then looks at next step button. The instructions respond to user gaze cursor at comfortable angle. The 3D hologram is back on the machine, and so the user follows tether and turns around. As the user turns around, instructions move with the user's intention, not blocking the user's view, but turning around with user. As user turns around, tether dynamically bends to continue to point at the 3D hologram.

In some examples, the operator can pin the Step card to turn off the tag-along feature, so that the Step card will not follow the operator's gaze while the Step card is pinned. In some examples, to pin the Step card, the operator selects the Pin button. In some examples, the pin action can be selected in various ways, such as selecting the Pin button by gaze, selecting the Pin button by gesture, or by voice command. In some examples, once the Step card is pinned, the operator can grab the Step card and move the Step card. For instance, in some examples, the operator can move the Step card by using a tap-and-hold to place the Step card in a new location. In some examples, while the Step card is pinned, even though the Step card remains in the same location unless the operator selects and moves it, the Step card stays in the same location but rotates to face the operator. In some examples, there is a command that can be used "beckon" or "summon" a pinned Step card to the operator's location. For instance, in some examples, if the operator says, "instructions," the step card will appear at the location of the operator's current gaze, even if the step card is pinned. In some examples, once pinned, the card remains in the same location, correlated to the real world, until there is an operator command to the contrary, such as an operator command to beckon the card, to move the card, or to unpin the card. In some examples, no matter where the operator pins or beckons the instructions, the tether from the instructions to the corresponding real-world location remains tethered to the real-world location.

In some examples, the operator can turn holograms off (or turn them back on), for example if the operator feels like a hologram is getting in the way. In some examples, an operator can turn off a hologram by gazing at the "eye" in the middle of the tether.

Some examples of guides may make use of spatial triggers. Spatial triggers may be used in examples of guides in a variety of different ways. Spatial triggers may have been added to a guide by the author to gain targeted information. In general, spatial triggers in the environment may be defined when the guide is authored for the purpose of gaining targeted information. One example of a spatial trigger is a spatial area trigger. A spatial area trigger may be based on a defined volume, such as a cubic volume for which the volume size may be selected by the author when the guide is authored. A spatial area trigger may be triggered based on an operator's hands coinciding with the defined cubic volume, based on an operator's eyes looking at the defined cubic volume, based on an operator's head coinciding with the defined cubic volume, and/or the like. For instance, in some examples, a spatial area trigger may be triggered when the operator's hands enter the cubic volume defined the spatial area trigger. In some examples, a spatial area trigger may be triggered when the operator's eyes look at the cubic volume defined the spatial area trigger. In some examples, the spatial trigger is trigger after the user's hands have been in the spatial area for an amount of time determined by the author when authoring the guide, or the like. In some examples, one or more external factors may also be involved in a determination as to whether the spatial triggered is triggered.

In some examples, a spatial trigger may cause an effect to occur while the operator is using the guide, based on triggering of the spatial trigger, or based on the spatial trigger not yet having been triggered. In some examples, the triggering of the spatial trigger has no effect while being used, but provides information that is later used in guides analytics. In some examples, a spatial trigger may cause an effect to occur while the operator is using the guide, based on triggering of the spatial trigger, or based on the spatial trigger not yet having been triggered, and also provides information that is later used in guides analytics.

The spatial triggers may be used for a number of different purposes in various examples. For instance, in some examples, the author may use a spatial trigger so that the guide analytics indicate whenever an operator places the operator's hands in an unsafe area. As another example, spatial triggers may be used to block progress in a guide based on 3D data. For instance, in some examples, the author may use a spatial trigger so that the operator cannot advance to the next step until the operator has looked at a pressure gauge for a predetermined amount of time.

Some examples of guides used for some examples of hologram device 501 may include a mechanism to enable quick advancement to the next step when an operator has completed a step of the task, based on a spatial trigger. In some examples, automatic advancement to a subsequent step based on a spatial trigger may be used or not used based on the status of an operating mode than can be turned on or off. For example, an operator using a guide for the first time may wish to turn automatic advancement based on spatial triggers off, to ensure that the operator does not advance to the next step until the operator is ready, whereas an operator that is already familiar with the guide may wish to turn the mode on so that the operator may quickly advance to the next step when each step is completed without wasting time in advancing to the next step of the guide. In some examples, when the mode for advancing to a subsequent step based on a spatial trigger is on, spatial triggers or other conditions are used to enable operators to advance through the guide simply by doing the work associated with each step of the guide.

In some examples, when the mode for automatic advancement is on, the mode may cause the guide to advance to the next step when the user's hands are detected to be in an area that is associated with the end of the current step or the beginning of the next step. For example, the first step of a guide may be to grab particular bolts, with the guide indicating where the bolts are in the real-world space. In this example, when the mixed-reality device detects that the user has grabbed the bolts, based on the user's detected hand position, the guide immediately and automatically advances to the next step. In some examples, when the mode for automatically advancing to the next step is on, as soon as the user's hand coincides with corresponding spatial trigger, the guide advances to the next step.

In some examples, the guide may include a visual hologram of where the user's hand should be to trigger a spatial trigger. In other examples, the guide does not include any such visual indication, but, for a spatial trigger used for automatic advancement to the next step, the spatial trigger may be triggered when the operator's hands are where the operator's hands would naturally be upon completion of the step. In some examples, even when the mode for automatic advancement to the next step is on, an operator may still advance to the step in a standard manner, such as via a verbal command (e.g., saying "next step" aloud), selecting the "Next step" button via gaze or hand signal, or other mechanism, for example if the user has completed the next step but for some reason the spatial trigger for advancing to the next step did not trigger.

Figure 6:
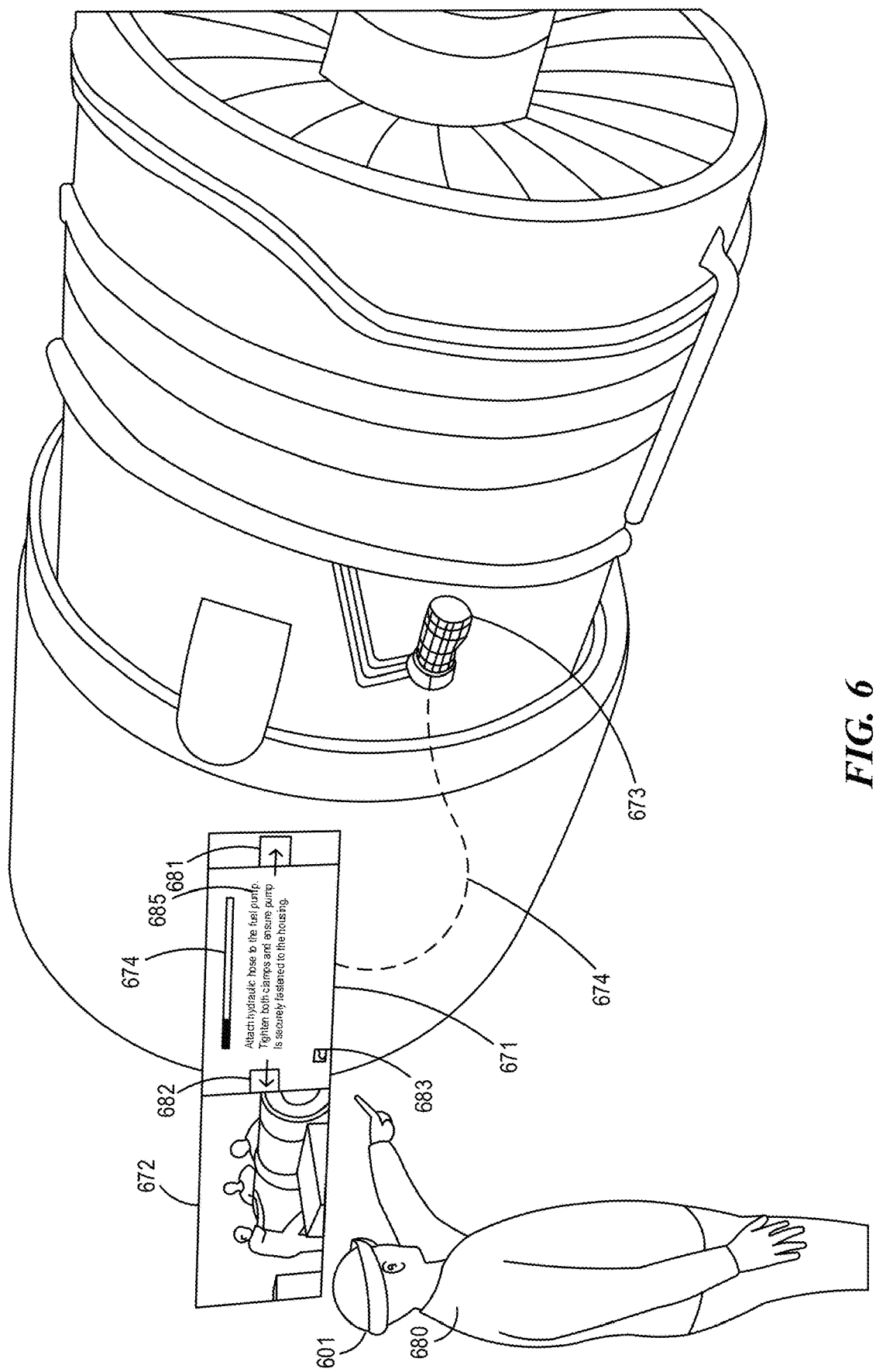
FIG. 6 is a diagram illustrating an example of an operator using an MR device.

One example of use of hologram device 501 is illustrated in FIG. 6. In the example illustrated in FIG. 6, an operator 680 is wearing mixed-reality (MR) device 601. Mixed-reality device 601 is an example of hologram device 501 that is a wearable, head-mounted display mixed-reality device. Via MR device 601, in the example illustrated in FIG. 6, the operator can see step card 671, picture 672, 3D hologram 673, and tether 674, all superimposed on a real-world environment. In some examples, tether 674 tethers step card 671 to the location in the real-world environment where work is to be performed for the current step. Step card 671 may include Next Step button 681, Go Back button 682, Media button 683, and Task Progress bar 674.

Next Step button 681 may be used to proceed to the next step in the task. Go Back button 682 may be used to go to the previous step in the task. Media button 683 may be used to toggle and off media, such as pictures, video, and/or other media present for the step. For the step illustrated in FIG. 6, media button 683 may be used to toggle on and off picture 672. In some examples, task progress 674 indicates how far along the current step is in the task. FIG. 6 shows but one example of a step card, and other examples may include more or less buttons than shown in FIG. 6. For example, as discussed above, some examples of the step card may include a pin button that may be used to pin or unpin the step card.

3D hologram 673 is an example of a three-dimensional hologram at the real-world location where work is to be performed in the real-world environment. As shown in FIG. 6 in accordance with one example, tether 674 is a visual tether from Step card 671 to the location real-world location where work is to be performed in the real-world environment for the current step in the task.

Returning to FIG. 5, although guides provided by guides application 509 may be useful for relative beginners, one or more guides may also be useful to experts. For instance, an expert may benefit from turning off holograms and/or tethers, but still using a checklist. The checklist may be particularly useful, even for an expert, particularly for use with a complex task for which it is crucial not to miss any steps.

In some examples, the authoring of guides for guides application 509 may be accomplished with the use of two applications: one application on one of the computing devices 515, and guides application 509 in authoring mode. In some examples, an author may start with an application on one of the computing devices 515, using the application to create the guide, choose an alignment method, add tasks and steps, write the instructions for the steps, and assign different types of assets to support those steps. In some examples, these supporting assets may include: 3D parts; 3D objects, such as objects from the 3D toolkit (arrows and numbers, for example); 2D media (images and videos); and/or the like.

In some examples, after creating the guide on an application on computing device 515, the author may use guides application 509 on hologram device 501 in Authoring mode to test the flow of the guide, assign holographic tethers to show operators where to focus, place holograms in the real world, and add styles to 3D objects (such as a warning or caution, for example).

The author may also choose an alignment method for the guide. Alignment may refer to the process of gaining an understanding of the world around the user and accurately placing holographic instructions in relation to their work. In some examples, calibration takes into account the user's interpupillary distance (a number that varies across individuals) that further improves alignment. In some examples, if marker alignment is selected, the author attaches a printed marker to a physical object in the real world. In some examples, if manual alignment is selected, the user imports a 3D representation (such as a CAD model or scanned model), and then lays the representation directly over a physical object in the real world. Independent from the method used for alignment, the following additional factors may impact the accuracy of the alignment and/or user perception of the alignment: the Interpupillary distance (IPD) setting, pre-scanning the environment, and device positioning. The IPD is the distance between the center of the user's pupils, which may be set on hologram device 501, as discussed in greater detail above.

Pre-scanning the environment may be accomplished by hologram device 501 actively scanning its environment for visible features to create maps of its surroundings. In some examples, hologram device 501 pre-scans the environment whenever the hologram device 501 is turned on and a user is signed in to hologram device 501. In some examples, hologram device 501 constantly improves the accuracy of these maps as it scans the environment from different viewpoints and stores them on the device. In some examples, holograms are placed in relation to these maps. In some examples, the more accurate the map, the more accurate the hologram placement.

In some examples, before using guides on a hologram device 501 that is unfamiliar with its environment, the user may wish to put on hologram device 501, sign into hologram device 501, and walk around the space where hologram instructions are placed or will be placed. In some examples, walking at a leisurely pace while slowly looking up and down will give the device the opportunity to find features and construct accurate maps. In some examples, this only need be done once for each environment because hologram device 501 stores the maps it created on the hologram device 501.

In some examples, after selecting an alignment method, the author may use the Outline page, which may be used to create the framework for the guide by adding as many tasks and steps as needed. In some examples, tasks are groups of steps; steps are the short, discrete work items that operators do to complete the task; and steps are the central building blocks for guides. In some examples, a special step called a Completion step as the last step of the guide lets operators know when they've reached the end of the guide. In some examples, the tasks, and the steps for each task, are entered on the Outline page. In some examples, in addition to tasks and steps, the Outline page shows customizable operator instructions.

In some examples, steps can be created directly on the outline page, or from a Step card page. In some examples, in the Step card page, the author writes the instructional text and assigns supporting assets for that step, such 3D content or media (e.g., image, audio, and/or video). In some examples, when the author views the guide on hologram device 501 in Authoring mode, the author will be able to see all of the assets that are associated with the steps, and can then use the authoring mode place the assets in their relevant spaces in the real world. For instance, in some examples, if an author assigns a pointer to a step in the application on one of the computing devices 515, the author can subsequently align that pointer to the thing that the author wishes to point to in the authoring mode of guides application 509 of hologram device 501. The author may place one or more instances of 3d models in space.

In some examples, once the author has finished the creating all of the steps on the application of one of the computing devices 515, the author can then take the next major step to creating the guide on hologram device 501, in Authoring mode of guides application 509. In entering Authoring mode, the author may align the guide, test the flow of the guide, add holographic tethers to visually tie the steps to physical objects in the real world, place holographic 3D content in the relevant corresponding spaces in the real world, and may, if desired, add styles to 3D content to add treatments such as a warning or caution. In some examples, the author can add visual design, including color, size, style selection, and other tools, including the selection of the color and size of holograms.

In some examples, authors can program the position of the tether without using code. In some examples, this may be accomplished with gesture or direct handle manipulation. In some examples, an author can pick up the tether, and place it in correlation with the real physical world. In this way, in these examples, the author connects the text instructions to where the work needs to be done. Furthermore, in some examples, the tether can be attached not only to the real world, but to a hologram which is situated meaningfully in the real world. In some examples, the author can place the tether by using a tap-and-hold to pick up one end of the tether and then attaching or re-attaching the tether end to a hologram or to a position in space.

In some examples, subsequent gesture movements to move the hologram, both in authoring mode and in normal operation, will move the tether as well. In these ways, in these examples, the author can tether positions by attaching the tether to the real world or to a meaningful spatially situated instruction hologram such as an arrow, zone, or 3D CAD file that is overlaid on top of a real physical object.

After aligning the guide, the author may test the flow of the whole guide to see how the guide flows. As the author steps through the guide, the author may make note of things be changed in the guide. For example, as a result of stepping through the guide, the author may wish to move some steps around, add tasks or steps, or add more supporting assets, and the author may wish to make these changes on one of the computing devices 515 before starting to place holograms, tethers, and styles.

In some examples, the author may choose pre-determined locations for the step card, for each step while authoring, and the author may choose, if preferable based on the space, a particular position for the step card rather than the position being determined more dynamically, by using pre-determined pinning of the card for each step.

When placing holograms, the author may walk through each step in the guide and place any assets that the author associated with that step when it was authored on one of the computing devices 515. For example, if the author added a 3D part to support a step, the author may place that 3D part over the part's physical counterpart in the real world. If the author added a 3D object from the 3D toolkit (an arrow or a number, for example), the author may place that object in an appropriate place in the real world to draw the operator's focus. In some examples, the author can place the same 3D part or 3D object as many times as desired.

In some examples, no further actions are necessary with regard to associated media such as video or audio, which will automatically appear when the operator goes to the step. In some examples, the user can select the Media button to close the image, video, or other media.

In some examples, the 3D assets associated with each step appear below the Step card. In some examples, to place them in the real world, the author may manipulate holograms as discussed elsewhere, such as via gestures. Tethers may be placed in the real-world environment, for example via gestures. Similarly, styles may be applied to holograms.

Authoring may include creation of parameters associated with spatial triggers, such as the location of spatial triggers, conditions on which spatial triggers are triggered, and/or the like.

Authoring may include the creation of aspects of guide analytics to be used after operators have used the authored guide. In some examples, authoring of the guide may include instrumentation that indicates how data is be collected while the guide is used, which data is collected while the guide is used, and/or the like. In some examples, authoring of the guide may include various aspects of how analytics will be performed, reported, and surfaced, including, in some examples, default options that may be changed by the user, and/or the like. In some examples, defining instrumentation and aspects of the analytics, reporting, and surfacing to be performed may be part of the process of authoring the guide, and in other examples, defining instrumentation and aspects of the analytics, reporting, and surfacing to be performed may be a separate step/process from authoring the guide.

Analytics may be performed for one or more guides after operators have used the guides via MR devices 501. In one example, guide analytics may be provided as part of a guides application suite that includes the guides authoring app used on one of the computing devices 515 and guides application 501. In some examples, guides analytics may be set up through the guides authoring application used on one of the computing devices 515. In some examples, guide analytics may be used by an organization to analyze the usage of guides across the organization. In some examples, the guide analytics capture information while operators are in the flow of actually performing tasks, and amalgamating this data over a number of different operators and performing analysis on this data. In some examples, the guide analytics may be used to provide various presentations, such as, for example, visual reports populated with guides telemetry data.

In some examples, the guide analytics capture many data points, including spatial telemetry—such as, for each operator, what the operator is doing or how efficient the operator is, time spent on a step, where the operator was looking, failure to complete step, the fact that a user stopped on a step, and various other interactions between the operator, hologram device 501, and the physical environment. The spatial telemetry may include multiple spatial telemetry parameters for each operator while the operator is performing the guide, such as head movement, eye movement, hand movements, and/or the like, of the operators while the operators perform the task of the guide.

In some examples, analytics is performed based on mixed-reality data received from mixed-reality devices used by operators using one or more guides on the mixed-reality devices. In some examples, analytics is performed on data from mixed-reality devices, and also data from other sources, such as mobile phones, other mobile devices, and/or the like, including information obtained from a mobile phone while a user is performing a step of an MR guide while using an MR device.

In some examples, when an operator uses the guides application 501 in Operator mode, each gaze-and-commit interaction on the Next step and Go back buttons, or other means of moving to another step of a guide, such as advancing to the next step of the guide based on a spatial trigger, is recorded together with the date and time of the interaction. Each operation of a guide in the Operator mode, whether completed from beginning to end of the guide or involving just a few steps, is called a run in some examples. The operator's user ID and information about the guide, such as step number, task number, and guide name are also recorded in some examples.

In some examples, the guides analytics may include a 3D heat map for each step of each guide. The 3D heat map may map the movement of each operator for the step of the guide being mapped, with the color indicating the frequency with which operators moved on a particular path. In some examples, the analytics may further include head movements and/or eye movements, by recording where the cursor indicated by the gaze went. For example, if the telemetry indicates that many users move their head between the directions and the workspace an inordinate number of times on a particular step, this may indicate that the instructions for the step could benefit from increased clarity.

In some examples, the guide analytics may flag a step for which there are such head movements and bring the step to the manager's attention as a step that may require increased clarity. For instance, in some examples, 3D data as part of the data received from mixed-reality devices may indicate that operator's head movements are frequently lowering on a particular step of a guide, which indicates that operators are bending over on that step, and accordingly, based on the data and programmed information regarding head position going too low based on the 3D data, guides analytics may flag this result by sending a notification to the guide creator which says "check ergonomics on this step to keep workers safe," or the like.

The heat map may be based on one or more spatial parameters recorded by the mixed-reality devices as the operators used the device to performs the tasks of guides and on which the guides analytics is performed, and amalgamated for the mixed-reality devices over which the guide was performed. The heat map may be based on a color spectrum or other suitable method to show the frequency of various spatial parameters, such as which head movements, eye movements, hand movements, or the like were in particular positions in the 3D space across all operators that performed the step of a guide. For instance, in some examples, a small number of operator's have movement (head, eye, hand, or whatever is being tracked) in a position appears as green, with a large frequency of users in a spatial position being red, with an intermediate frequency at a position shown as yellow, all as part of a color gradient over a color frequency spectrum that shifts away from green and towards red with increased frequency of position at a space for the step. The heat map may have an adjustable angle, so that a user viewing the map may adjust the angle at which the heat map is viewed.

In addition to 3D heat maps, other types of heat maps may be created. For instance, in some examples, 2D heat maps may be created based on created a top-down view from the 3D heat map. For instance, in some examples, the 3D heat map may be projected onto a top-down view of a 2D floor plan of the space, to create the 2D heat map, by which the movement can be seen on the 2D floor plan. For instance, in some examples, the movement, using the color spectrum gradient, may be overlaid onto the 2D floor plan, along with holograms projected in the space also overlaid onto the floor plan in some examples. Analysis of trends and analysis of other information and presentations such as charts and/or the like may also be performed on the 2D heat map in some examples.

A heat map may be created based on each operator's movements through the space and eye-gaze or head-gaze movements, including hand positions over time, and mapping this for each operator, for each step of each guide, with a color-coded indication of how many operator's movements were in a particular area during the step. This may be used for troubleshooting purposes—the author of a guide may, for example, determine that many operators are looking at a location that is not relevant to the step being performed, determine the cause of the undesirable behavior, and edit the guide accordingly. The heat map may also track differences in behavior between versions of the guide, to determine whether the change to the guide to stop an undesired behavior from happening was successful. In some examples, when tracking these positions over time, the data can indicate if the "automatic-next" positions are being used properly.

In some examples, a heat map may be created based eye tracking of operators for each operator that performed a step of a guide, with the mixed-reality device of each operator recording the positions of the operator's eyes, and, when the heat map is generated, overlaying where each operator is looking on an image of the world while the operator is performing the step. As discussed above, in some examples, other movement than eye tracking, such as movement of the user through the space, hand tracking, head movement, and the position of the mixed-reality device in relation to the step information may be all recorded, and be part of data collected and amalgamated by guide analytics, and used for the generation of heat maps by guide analytics, and the heat map may enable selection of movement of which of these parameters is shown on the heat map. In some examples, there may be a default option for the selection and/or recommendation as to which options are selected to be displayed for the heat map.

A heat map may be displayed in various manners in various examples. In some examples, the heat map may display the entirety of the positions all at once. In some examples, the heat may can be displayed over time, with a time display with a time slider showing the progress of position for a particular step as time progresses for the step, so that the slider scrubs the time of the data shown on the heat map. In this way, in some examples, a user can use a 3D viewport of the heat map and the time slider together, to scrub through and better understand what happened in various runs of the guide. In some examples, whether to show the position all at once or correlated with time may also be a selectable option. In some examples, there heat map may include a variety of selectable options as filters available for the user to select, via selectable check boxes or via another suitable manner.

A variety of information may be determined based on heat maps. For example, if users frequently lean in to see a hologram at a particular step, this may be an indication that the hologram is too small. The heat map may be viewed to obtain a variety of insights in different manners. It may also be used to change the guide, and/or the real-world environment for the guide, in order to improve aspects of how the step is completed, such as for safety, accuracy, efficiency, and/or in other ways. For example, it may be determined that, for a particular step, some users are relatively fast at completing the step, and some users are relatively slow at completing the step, and that most of the relatively slow users are walking around a rug, and most of the relative fast users are walking directly over the rug. This information may be used to determine that the rug should be removed in order to increase the average efficiency at which the step is being completed.

In some examples, heat maps can be viewed directly to obtain insight, or charts or other information based on the heat charts can viewed. Further, in some example, analytics may be performed on the heat maps, with particular information being presented, such as outlier information, for example.

In some examples, the analytics may be determined by matching positions, such as the positions tracked by heat maps, with the time tracking data for the process. In some examples, the positions tracked by the heat maps may be matched with the time tracking data for the process, correlating the time tracking data with the positions, and performing further analysis based on the tracked positions as correlated with the time tracking data.

In some examples, the data is also be used to create various flags, based the spatial telemetry data and other information, so that inefficiencies, unsafe conditions, poor ergonomics, and/or the like may be determined and flagged. In various examples, such flags may be provided after the fact, and/or real-time alerts may be provided when appropriate in order to provide real-time feedback. Real-time feedback may also be used for event stitching. The guide may be configured in such a way that, if certain things occur, based on the spatial telemetry for the operator or other factors, that a certain things happens, and events can be stitched together based on these conditionals in order to enable the guide to be adaptable to provide event stitching based on factors detected by the mixed-reality device.

In some examples, the guides analytics reports are designed to help answer high-level questions about guides usage, such as how many guides have been used to date, whether the number of times a guide is run per day increasing, decreasing, or remaining stable over time, and which guides take the most time to complete. In some examples, guides analytics may be used to drill into detailed time-tracking information at the task and step levels, to determine for example, which steps of the guide the most time is spent on, and which steps of the guide have the most variability in operator time.

In some examples, guides analytics presentations may include information about the triggering of spatial triggers in runs of the guide, which may be used, among other things, to help authors and managers understand and answer questions about a process. Spatial triggers may allow the author of a guide to target specific data events, such as whether operators place their hands in a certain area, whether operators have looked at a particular location, and/or the like. In some examples, the spatial triggers enable targeted information to be determined in guide analytics presentations. For example, with appropriate spatial triggers place in the guides, the guide analytics may be used to determine, for example, whether operator's hands have been placed in an unsafe area, whether operators are looking at pressure gauge during a particular step of the guide, and/or the like. In some examples, the use of spatial triggers may enable, during subsequent guide analytics and presentations, the ability to help users collect meaningful data events, including meaningful 3D data events, that are targeted to the spatial flows of a particular guide, and to do so without the user having to sift through all of the raw data.

In some examples, guides analytics reports provide information about operator adoption and usage and give guide authors a data-driven way to improve their guides. For instance, in some examples, an author could focus their editing efforts on steps that take a long time to execute or show a high degree of variability among operators. Guides analytics reports may also be used in training scenarios for both trainers and trainees to better understand performance and improvement over time.

In some examples, the guides analytic reports may include a guides usage report that provides an overview of all guides used in the corresponding organization. In some examples, the guides usage report may include a dropdown menu that allows a user to select which guides are used to generate the visuals and statistics in the report, with all guides selected by default. The guides usage report may include summary statistics that allow a user to quickly determine how many guides have been used by at least one operator to date, how many users have operated at least one guide to date, how many holographic devices 501 have been used to operate at least one guide to date, and how many total runs have been completed to date.

The guides usage report may also allow the user to determine whether daily guide usage is changing. For instance, in some examples, the guides usage report that includes a bar chart of run counts (y-axis) per day (x-axis) allows the user to see trends such as increasing, decreasing, or stable daily guide usage. In some examples, the user may be able to drill up/expand to the next level. In some examples, the dates have a hierarchy of year, quarter, month, day, and by default the bar chart displays run counter per day, but a user may change this selection, for example, to have the bar chart display run counts per month. In some examples, the user may change the date range displayed on the bar chart.

In some examples, the guides usage report may allow the user to determine which guide is most frequently used, and to determine the average run time per guide. For instance, in some examples, as discussed above, the guides usage report includes a bar chart of run counts per guide. In some examples, the bar chart of run counts (x-axis) per guide (y-axis) allows a user to quickly identify which guides are used most and least in the organization (top and bottom of the chart respectively). In some examples, the chart is scrollable if there are too many guides to view on one screen. In some examples, the bar chart of average run time in minutes (x-axis) per guide (y-axis) allows a user to quickly identify the guides that take the most or least amount of time to operate (top and bottom of chart respectively).

In some examples, the guides analytics reports may also include a process time-tracking report. In some examples, the process time-tracking report may be used to drill into usage and step-level run time data for a single guide. In some examples, the process time-tracking report may be used to allow the user to determine how many operators have run the guide at least once, how many devices have been used to operate the guide at least once to date, how many total runs of the guide have been completed to date, whether the daily guide usage is changing, the average run time of the guide, the longest run time of the guide, the shortest run time of the guide, and how long each task or step takes. In some examples, data for a single recent run can be selected and viewed. In some examples, a report can be filtered by date or step time.

Guide analytics may also include comparative analysis. For example, analytics may include analytics based on relationships between multiple run-throughs of a guide, including multiple run-throughs of a guide by the same operators, multiple run-throughs of a guide regardless of operator, and/or the like. Comparative analysis may include comparative positions, including comparative positions of hands and heads of operators in various run-throughs of a guide, and/or the like.

Various action items may be taken based on information gained from the guide analytics, including training, updating the instructions, and/or alerting for safety infractions. In some examples, guide analytics may be used to assist in improving steps that are "scattered" in that the time spent on a particular step varies greatly from user to user. For some steps, it may be desirable to gain input from one or more operators that are quick with the step, to be used to further clarify the step. If the step is changed accordingly, the guide analytics may be used to determine any change in the time operators spend in the step after the step was changed compared to before the step was changed. In some examples, guides analytics may be used to track down slow steps across all operators and improvements in order to make them more efficient. For instance, in some examples, guides analytics may be used to determine whether users have to walk farther to get parts, and if so, a determination can be made as to whether to move the parts closer to the user's work area.

In some examples, guide analytics may be used to provide both manager-focused dashboards and operator-specific dashboards. An operator may use operator-specific dashboards to gain feedback regarding, for example, which tasks they are more efficient with, and which tasks they are less proficient with, which may help the operator to improve.

In some examples, with guide analytics, smart dashboards cause important data to be flagged, and surfaced to the appropriate person.

The guide analytics may be used in terms of properly authoring and updating the guide with regard to spatial triggers. The guide analytics may include information about where the operator's hand typically are when performing particular steps, for example via a spatial heat map, and that may be used to help the author in determining where to place the spatial triggers. In some examples, a heat map may be used to clarify which users are leveraging gestures to automatically trigger a subsequent step to navigate (i.e., for which steps the spatial triggers that are used to automatically advance to the next step are being triggered), and which users are activating buttons manually, and may assist in determining the optimal placement for the spatial trigger for automatically advancing to the next step.

In some examples, the heat map may be used for improvement of the spatial triggers. For example, if a spatial trigger is used for automatically advancing to the next step of the guide, and based on the heat map, it is seen that most hands are below the current central position of the spatial trigger, the author may then adjust the guide to lower the position of the spatial trigger. In some examples, the guide analytics may be used to automatically place a spatial trigger for each step for advancement to the next step of the guide based on where the data indicates the user's hands are at the end of the step, or, rather than automatically placing the spatial trigger there, the authoring application may make a recommendation that the author place the spatial trigger in that location. The heat map may also be used to assist in the placement of other types of spatial triggers.

The guide analytics information may also be used to provide particular real-time information, including, for example, for targeted data. For instance, in some examples, a particular individual can use guide analytics set up a system to be notified in a particular manner when a particular operator completes a particular step. For example, the individual may wish to know when a particular propeller wing is completed, and may set up the analytics so that the individual is automatically emailed immediately when the corresponding step is completed indicating that the propeller wing has been completed.

The analytics performed on the data amalgaming from operators of mixed-reality devices operating one or more mixed-reality guides may include determining, for example, time spent on a step of the first mixed-reality guide, quantity of mixed-reality device that have been used to run the first mixed-reality guide, whether an initiated step of the first mixed-reality guide was completed, how many guides have been used, how many times a guide was run in a particular time period, operator location throughout a step of a guide, eye movement of operators during a step of a guide, head location of operators during a step of a guide, hand location of operators during a step of a guide, body position of operators during a step of a guide, whether a spatial trigger associated with a step of the guide was triggered, or a comparison between at least two runs of a guide.

After analytics are performed and presentations based on the analytics are viewed, the results may provide a basis for altering the guide itself, for example, via the authoring program, examples of which are given above. For instance, in some examples, an author may initially author a guide, the guide may be used for a time by a number of operators, analytics may be performed, and presentations generated and surfaced to one or more users based on the analytics. A user may then use the authoring tools to revise the guide based on analysis of the guide. This is one example of computing device 515 enabling a user to revise the guide based on one or more presentations generated by guide analytics performed by computing device 515. In various examples exampling, computing device 515 may enabling a user to revise the guide based on the mixed-reality data, that is, data received from operators using the guide with mixed-reality devices.

Enabling the user to revise the guide based on the mixed-reality data may include, for example, enabling the guide to be altered based directly on the mixed-reality data, enabling the first mixed-reality guide to be altered based on the analytics performed on the mixed-reality data, or enabling the first mixed-reality guide to be altered based on the one or more presentations, where the presentations are based on the mixed-reality data, for example by being based on analytics of the mixed-reality data. Altering the first mixed-reality guide based on the mixed-reality data may include, for example, selecting a location of a spatial trigger, moving a location of a spatial trigger, changing a size of a hologram, changing a position of a hologram, changing a color of a hologram, changing an opacity status of a hologram (e.g., making a hologram more or less opaque), changing an animation associated with a hologram (e.g., adding, removing, or altering an animation of a hologram), changing a style of a hologram (e.g., adding, removing, or altering a style of a hologram—see above for a discussion of styles), adding a hologram, adding a selectable option, changing a selectable option, adding a safety alert, adding an ergonomics alert, changing an instruction step card, adding a video to an instruction step card clarifying a step, altering a video of an instruction step card, adding an image to an instruction step card, and/or altering an image of an instruction step card.

When a user first makes used a hologram device 501, the user may be given full and fair notice of data collected by hologram device 501, and given a fully informed choice as to whether to content to the collection of data, so that the user must affirmatively either opt in or opt out of data collection at that time, with mechanisms in place to ensure that data is not collected from a user that does not consent to data collect. Further, it may be ensured that the user may choose to opt out of data collection at a subsequent time, should the user choose initially to opt in to data collection.

In some examples, files and the like may be synchronous across multiple devices. In some examples, whenever text of a file is changed, as soon as the change has been let go of, the change is immediately propagated to the server. In some examples, if there is a conflict where the exact same step is being modified for the same component, then one change takes precedence over the other. However, in some examples, if the same step is being modified but in different compartments on different devices, such as a change to the text component on one computing device, and a change to the 3D component on another computing device, both changes can be updated. In some examples, the same guide file is therefore being auto-saved and synchronized across multiple devices, allowing multiple authors to improve the same guide across the guide's various compartments.

Figure 7:
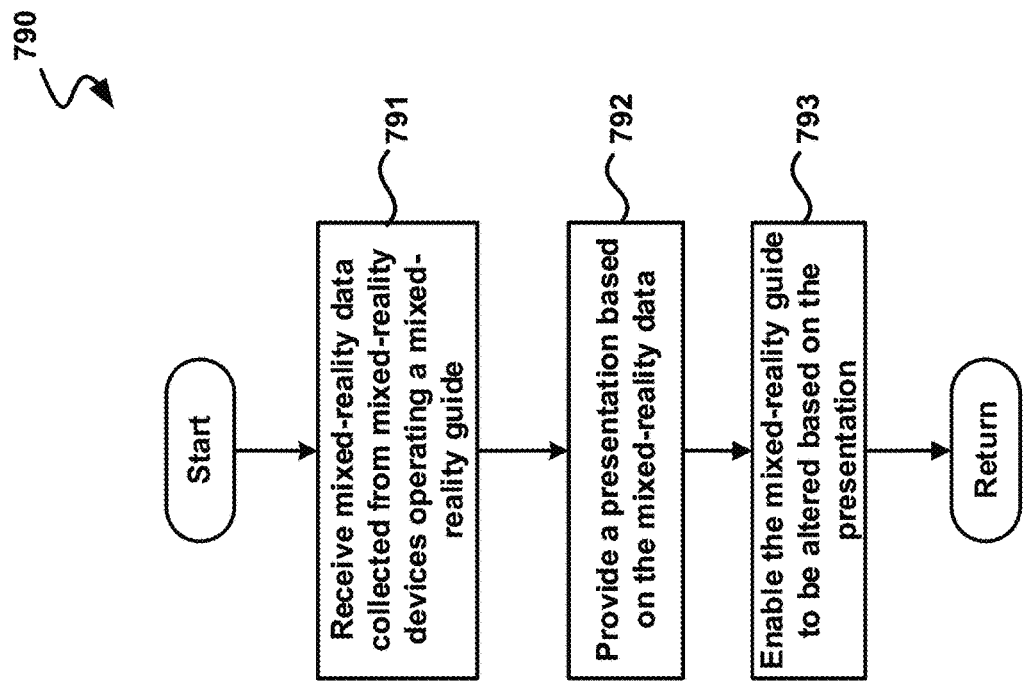
FIG. 7 is a flow diagram illustrating an example of a process for MR analytics, in accordance with aspects of the present disclosure.

FIG. 7 illustrates an example dataflow for a process (790) for MR analytics. In some examples, process 790 is performed by a device, such as device 200 of FIG. 2 or computing device 10 of FIG. 4.

In the illustrated example, step 791 occurs first. At step 791, in some examples, from each mixed-reality device of a set of mixed-reality devices, mixed-reality data based on use of at least a first mixed-reality guide on the mixed-reality device is received. In some examples, the mixed-reality data includes spatial telemetry data collected for at least one step of a set of steps of the first mixed-reality guide generated via the mixed-reality devices operating the first mixed-reality guide and providing a mixed-reality view, such that: while the first mixed-reality guide is navigated to a step of the set of steps of the first mixed-reality guide, the mixed-reality view includes a hologram at a real-world location in the real-world environment at which work associated with the step is to be performed.

As shown, step 792 occurs next in some examples. At step 792, in some examples, a presentation that is based on the mixed-reality data is provided. As shown, step 793 occurs next in some examples. At step 793, in some examples, the first mixed-reality guide is enabled to be altered based on the mixed-reality data. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:
1. A method, comprising:
providing a first mixed-reality guide to each mixed-reality device of a set of mixed-reality devices, the providing of the first mixed-reality guide enabling the mixed-reality devices of the set of mixed-reality devices to operate the first mixed-reality guide while providing a mixed-reality view, such that: the first mixed-reality guide includes a set of steps for completing a task, and while the first mixed-reality guide is navigated to a step of the set of steps of the first mixed-reality guide, the mixed-reality view includes a hologram at a real-world location in the real-world environment at which work associated with the step is to be performed;
receiving, from each mixed-reality device of a set of mixed-reality devices, mixed-reality data based on use of at least the first mixed-reality guide on the mixed-reality device, wherein the mixed-reality data includes spatial telemetry data collected for at least one step of a set of steps of the first mixed-reality guide;
providing a presentation that is based on a first subset of the spatial telemetry data;
enabling the first mixed-reality guide to be altered based on a second subset of the spatial telemetry data, wherein the first subset of the spatial telemetry data and the second subset of the spatial telemetry data each include spatial telemetry data amalgamated from multiple runs through at least a portion of the first mixed-reality guide such that each run of the multiple runs is a separate run through multiple steps of the set of steps of the first mixed-reality guide; and
performing analytics on the mixed-reality data, wherein providing the presentation is based on the analytics performed on the mixed-reality data, and wherein enabling the first mixed-reality guide to be altered based on the second subset of mixed-reality data includes enabling at least one step of the set of steps of the first mixed-reality guide to be altered based on the performed analytics.

2. The method of claim 1, wherein enabling the first mixed-reality guide to be altered based on the mixed-reality data includes at least one of: selecting a location of a spatial trigger, moving a location of a spatial trigger, changing a size of a hologram, changing a position of a hologram, changing a color of a hologram, changing an opacity status of a hologram, changing an animation associated with a hologram, changing a style of a hologram, adding a hologram, adding a selectable option, changing a selectable option, adding a safety alert, adding an ergonomics alert, changing an instruction step card, adding a video to an instruction step card clarifying a step, altering a video of an instruction step card, adding an image to an instruction step card, or altering an image of an instruction step card.

3. The method of claim 1, wherein the spatial telemetry data includes two or more spatial parameters for each mixed-reality device of the set of mixed-reality devices.

4. The method of claim 1, wherein the mixed-reality data includes time spent on at least one step of the first mixed-reality guide.

5. The method of claim 1, wherein the mixed-reality data includes, for each step initiated for the first mixed-reality guide, whether the step was completed.

6. The method of claim 1, wherein, for each mixed-reality device of the set of mixed-reality devices, the first mixed-reality guide includes at least one spatial trigger that is triggerable, via the mixed-reality device, to advance to a subsequent step of the first mixed-reality guide, and wherein the mixed-reality data includes information associated with, for the set of mixed-reality devices, whether the spatial trigger has been triggered.

7. The method of claim 1, wherein the spatial telemetry data includes eye tracking data.

8. The method of claim 7, wherein the presentation includes a heat map that is based on the eye tracking data.

9. The method of claim 1, wherein the presentation includes a heat map that is based on the spatial telemetry data.

10. The method of claim 9, wherein the heat map is a three-dimensional heat map associated with the first mixed-reality guide, the heat map showing spatial telemetry data through the real-world environment associated with the first-mixed reality guide.

11. The method of claim 9, wherein the heap map includes a top-down view associated with the first mixed-reality guide, the heat map showing spatial telemetry data through the real-world environment associated with the first mixed-reality guide overlaid on a floor plan that is associated with the real-world environment associated with the first mixed-reality guide.

12. The method of claim 1, wherein performing analytics on the mixed-reality data includes determining at least one of: time spent on a step of the first mixed-reality guide, quantity of mixed-reality device that have been used to run the first mixed-reality guide, whether an initiated step of the first mixed-reality guide was completed, how many guides have been used, how many times a guide was run in a particular time period, operator location throughout a step of a guide, eye movement of operators during a step of a guide, head location of operators during a step of a guide, hand location of operators during a step of a guide, body position of operators during a step of a guide, whether a spatial trigger associated with a step of a guide was triggered, or a comparison between at least two runs of a guide.

13. The method of claim 1, wherein enabling the first mixed-reality guide to be altered based on the mixed-reality data includes at least one of enabling the first mixed-reality guide to be altered based directly on the mixed-reality data, enabling the first mixed-reality guide to be altered based on the analytics performed on the mixed-reality data, or enabling the first mixed-reality guide to be altered based on the provided presentation.

14. An apparatus, comprising:
a device including at least one memory adapted to store run-time data for the device, and at least one processor that is adapted to execute processor-executable code that, in response to execution, enables the device to perform actions, including:
amalgamating operator data collected from a plurality of mixed-reality devices, the operator data based on use of at least a first mixed-reality guide on the plurality of mixed-reality devices, wherein the first mixed-reality guide includes a plurality of steps for completing a task, and wherein, for each mixed-reality device of the plurality of mixed-reality devices, the operator data includes spatial telemetry data collected for at least one step of the plurality of steps of the first mixed-reality guide generated via the mixed-reality devices operating the first mixed-reality guide and generating a mixed-reality view, such that: while the first mixed-reality guide is navigated to a step of the plurality of steps of the first mixed-reality guide, the mixed-reality view includes holographic elements juxtaposed with a real-world environment;
employing at least one processor to generate a presentation that is based on a first subset of the spatial telemetry data;
enabling the first mixed-reality guide to be changed based on a second subset of the spatial telemetry data, wherein the first subset of the spatial telemetry data and the second subset of the spatial telemetry data each include spatial telemetry data amalgamated from multiple runs through at least a portion of the first mixed-reality guide such that each run of the multiple runs is a separate run through multiple steps of the plurality of steps of the first mixed-reality guide; and
performing analytics on the mixed-reality data, wherein providing the presentation is based on the analytics performed on the mixed-reality data, and wherein enabling the first mixed-reality guide to be changed based on the second subset of mixed-reality data includes enabling at least one step of the set of steps of the first mixed-reality guide to be altered based on the performed analytics.

15. The apparatus of claim 14, wherein the presentation includes a heat map that is based on the spatial telemetry data.

16. The apparatus of claim 14, wherein the spatial telemetry data includes two or more spatial parameters for each mixed-reality device of the plurality of mixed-reality devices.

17. A processor-readable storage medium, having stored thereon processor-executable code that, upon execution by at least one processor, enables actions, comprising:
amalgamating mixed-reality data collected from a set of mixed-reality devices based on use of at least a first mixed-reality guide of the set of mixed-reality devices that are each configured to provide a mixed reality view while enabling navigation through a plurality of steps of the first mixed-reality guide such that the mixed-reality data includes the spatial telemetry data, wherein the plurality of steps of the first mixed-reality guide are steps for completing a task;
creating a presentation that is based on spatial telemetry data amalgamated from multiple runs through at least a portion of the first mixed-reality guide such that each run of the multiple runs is a separate run through multiple steps of the plurality of steps of the first mixed-reality guide;
enabling alteration of the first mixed-reality guide based on the presentation; and
performing analytics on the mixed-reality data, wherein providing the presentation is based on the analytics performed on the mixed-reality data, and wherein enabling the first mixed-reality guide to be altered based on the second subset of mixed-reality data includes enabling at least one step of the set of steps of the first mixed-reality guide to be altered based on the performed analytics.

18. The processor-readable storage medium of claim 17, wherein the presentation includes a heat map that is based on the spatial telemetry data.

19. A method, comprising:
providing a first mixed-reality guide to each mixed-reality device of a set of mixed-reality devices, the providing of the first mixed-reality guide enabling the mixed-reality devices of the set of mixed-reality devices to operate the first mixed-reality guide while providing a mixed-reality view, such that: the first mixed-reality guide includes a set of steps for completing a task, while the first mixed-reality guide is navigated to a step of the set of steps of the first mixed-reality guide, the mixed-reality view includes a hologram at a real-world location in the real-world environment at which work associated with the step is to be performed;
receiving, from each mixed-reality device of a set of mixed-reality devices, mixed-reality data based on use of at least the first mixed-reality guide on the mixed-reality device, wherein the mixed-reality data includes spatial telemetry data collected for at least one step of a set of steps of the first mixed-reality guide;
providing a presentation that is based on a first subset of the spatial telemetry data; and
enabling the first mixed-reality guide to be altered based on a second subset of the spatial telemetry data, wherein the first subset of the spatial telemetry data and the second subset of the spatial telemetry data each include spatial telemetry data amalgamated from multiple runs through at least a portion of the first mixed-reality guide such that each run of the multiple runs is a separate run through multiple steps of the set of steps of the first mixed-reality guide, wherein the task is a manufacturing assembly task.

* * * * *